United States Patent
Akiyama

(10) Patent No.: US 7,135,831 B2
(45) Date of Patent: Nov. 14, 2006

(54) METHOD AND DEVICE FOR CONTROLLING MOTOR

(75) Inventor: Shigeki Akiyama, Aichi-ken (JP)

(73) Assignee: Brother Kogyo Kabashiki Kaisha, Nagoya (JP)

(*) Notice: Subject to any disclaimer, the term of this patent is extended or adjusted under 35 U.S.C. 154(b) by 0 days.

(21) Appl. No.: 11/289,446

(22) Filed: Nov. 30, 2005

(65) Prior Publication Data

US 2006/0113931 A1    Jun. 1, 2006

(30) Foreign Application Priority Data

Nov. 30, 2004   (JP) ............... 2004-347491

(51) Int. Cl.
G05B 19/29  (2006.01)

(52) U.S. Cl. ............... 318/601; 318/603; 318/626

(58) Field of Classification Search ........ 318/268–279, 318/463, 599–603, 622, 626, 632
See application file for complete search history.

(56) References Cited

U.S. PATENT DOCUMENTS

| | | | | |
|---|---|---|---|---|
| 3,767,972 A | * | 10/1973 | Noddings et al. ........... | 361/240 |
| 3,838,325 A | * | 9/1974 | Kobayashi et al. ......... | 388/844 |
| 3,984,868 A | * | 10/1976 | Ragle et al. .............. | 360/73.11 |
| 4,155,105 A | * | 5/1979 | Braun ........................ | 360/51 |
| 4,331,307 A | * | 5/1982 | Furuta ....................... | 242/357 |
| 4,647,826 A | * | 3/1987 | Ota ............................ | 318/561 |
| 5,325,460 A | | 6/1994 | Yamada et al. | |
| 5,713,533 A | * | 2/1998 | Nordlof et al. .......... | 242/418.1 |
| 5,748,206 A | * | 5/1998 | Yamane ...................... | 347/37 |
| 6,654,508 B1 | * | 11/2003 | Markham ................... | 382/291 |

FOREIGN PATENT DOCUMENTS

| | | |
|---|---|---|
| JP | 1990307384 A | 12/1990 |
| JP | 1991007371 A | 1/1991 |
| JP | 1994237589 A | 8/1994 |
| JP | 1996108592 A | 4/1996 |
| JP | 1999299276 A | 10/1999 |
| JP | 2001310517 A | 11/2001 |
| JP | 2003079189 A | 3/2003 |
| JP | 2003335011 A | 11/2003 |

* cited by examiner

*Primary Examiner*—Bentsu Ro
(74) *Attorney, Agent, or Firm*—Baker Botts L.L.P.

(57) ABSTRACT

A motor control method is provided in which a cycle between at least one of leading edges and trailing edges of a pulse signal is measured. The pulse signal is outputted from a pulse signal generator which generates a pulse signal every time a driven target is driven for a specified distance by a motor. A driving velocity of the driven target is calculated from the measured edge cycle. A manipulated variable of the motor is calculated such that the calculated driving velocity corresponds to a specified target velocity, and the motor is driven and controlled based on the manipulated variable. The driving velocity is replaced with a specified set velocity that is lower than the target velocity, when no output of edges from the pulse signal generator continues for and over a specified replacement determination time while the motor is driven and controlled.

24 Claims, 20 Drawing Sheets

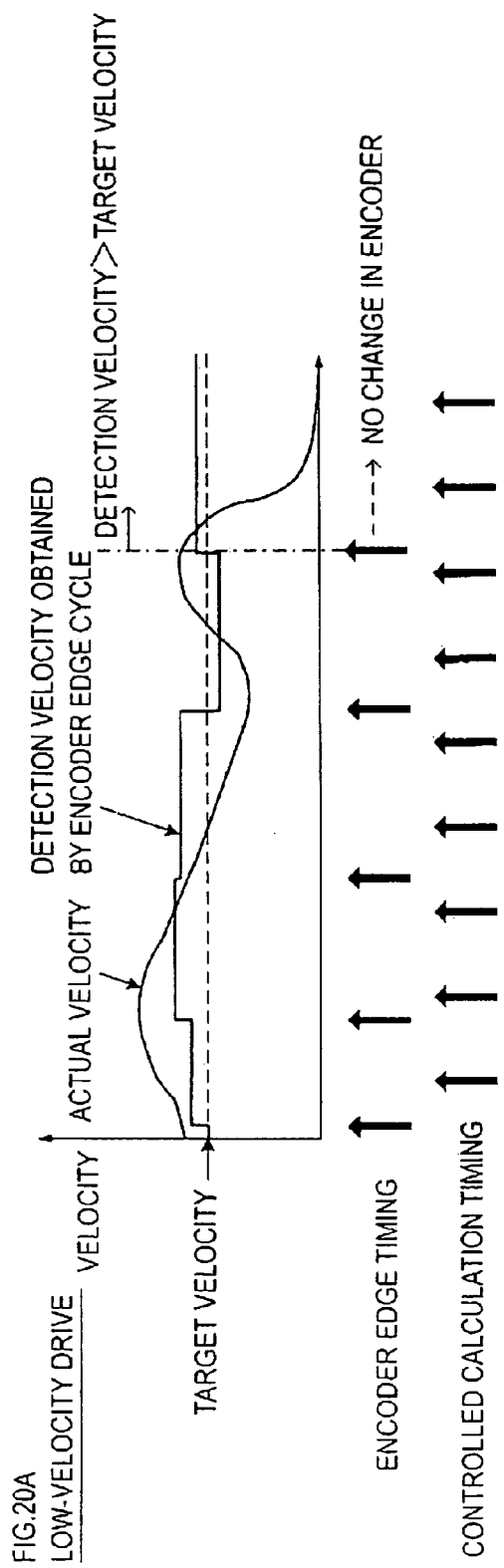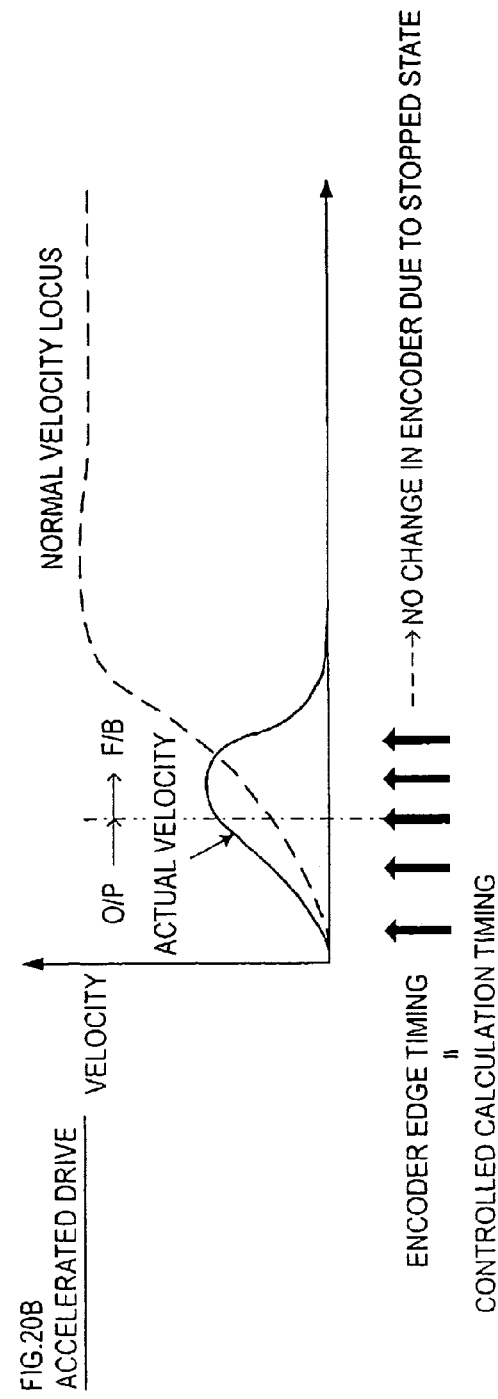
FIG.20A
LOW-VELOCITY DRIVE
FIG.20B
ACCELERATED DRIVE

METHOD AND DEVICE FOR CONTROLLING MOTOR

CROSS-REFERENCE TO RELATED APPLICATIONS

This application claims the benefit of Japanese Patent Application No. 2004-347491 filed Nov. 30, 2004 in the Japan Patent Office, the disclosure of which is incorporated herein by reference.

BACKGROUND

This invention relates to a method and a device for controlling a motor, in which a driving velocity of a driven target driven by the motor is calculated based on an edge cycle of a pulse signal, so that the motor is driven and controlled at a target velocity which corresponds to the driving velocity.

Heretofore, an image forming apparatus such as an ink jet printer is provided with a carriage mounting a recording head thereon. The carriage is disposed capable of being moved to and fro along a guide shaft, and driven (moved) by a motor.

In this type of the image forming apparatus, it is necessary to move the recording head (and the carriage) at a constant velocity at the time of forming an image on a recording sheet. Therefore, the motor, driving the carriage, is accelerated per one scan of the carriage so that the moving velocity of the carriage goes up to a constant target velocity at a recording start position where recording operation by the recording head is started. When the carriage reaches the recording start position, the carriage is moved at the constant target velocity until a recording termination position where the recoding operation by the recording head is ended. When the carriage reaches the recording termination position, the carriage is decelerated to be stopped at a target stop position.

Also, this type of the image forming apparatus is known to include a reflective optical sensor in the carriage at a position facing the recording sheet. While the carriage is moved at an extremely low velocity, the change in level is detected of light receiving signals from the reflective optical sensor, so that the positions of both ends of the recording paper are optically detected which are arranged to face the recording head.

In the case of controlling a motor as above, every time the carriage as a driven target is moved for a specified distance (or every time a rotation shaft of the motor is rotated by a specified angle), an encoder operates and generates pulse signals. The motor is feedback controlled so that the moving velocity of the carriage (i.e., the driving velocity of the driven target), calculated discretely based on the pulse signals outputted from the encoder, corresponds to a specified target velocity.

However, in the case of feedback controlling the motor as such, when the motor is driven at a low velocity, e.g., at the time of detecting the positions of both ends of the recording paper, rotation of the motor is temporarily stopped due to fluctuation, etc., of the load applied to the motor. Sometimes the motor is never recovered from the stopped state.

In other words, in the feedback control of the motor as above, the driving velocity of the driven target is updated per edge timing of the pulse signal outputted from the encoder. Therefore, if a manipulated variable of the motor is set to be calculated per predetermined constant cycle, the actual velocity of the driven target is sometimes updated or sometimes not updated by the pulse edge, at the time of calculating the manipulated variable.

On the other hand, when the driven target is driven at a low velocity, the driving velocity of the driven target is substantially reduced. The friction caused in the driving system is changed from dynamic to static so that the load applied to the motor is increased. Also in this case, the motor itself cannot obtain stability from a hack electromotive force if a certain level of rotation velocity is not produced. Thus, the motor is susceptible to the effect of the load. In addition, the load applied to the motor is fluctuated by uncertain factors such as conditions of grease applied and minute foreign bodies (e.g., dust) stuck to a sliding portion of the driven target.

Therefore, the driven target is sometimes stopped temporarily when driven at a low velocity. As shown in FIG. 20A, if the velocity (detection velocity) of the driven target, which is updated per edge timing of the encoder, is higher than the target velocity, a manipulated variable is calculated, which decelerates the velocity of the motor, at the calculation timing (controlled calculation timing) of the manipulated variable. As a result, the motor is completely stopped and this eventually leads to a mechanical error of the driving system.

FIG. 20A is a time chart showing a relationship among the actual velocity of the driven target, the detection velocity obtained based on the encoder edge cycle, and the target velocity, when a motor control device is constituted such that the calculation timing (controlled calculation timing) of a manipulated variable occurs per constant cycle. Even when the controlled calculation timing is set to correspond with the encoder edge timing, the same problem occurs.

In this case, as the driven target is stopped, the calculation of the manipulated variable is also stopped. Thus, similar to the case in which the controlled calculation timing is set at a constant cycle, the stopped state of the driven target continues until a mechanical error of the driving system is found.

The problem like the above also occurs at the time of accelerating the motor.

For example, the carriage as the driven target is assumed to be accelerated from the stopped state to a target velocity. As shown in FIG. 20B, immediately after the driven target is started to be driven, so-called open loop control (O/P) is performed in which the manipulated variable of the motor is sequentially set in synchronization with the encoder edge timing so that the driven target is accelerated along a velocity locus predetermined in accordance with the characteristics of the driving system. Then, after the driven target is accelerated to some extent, the motor control is switched to the aforementioned feedback control (F/B).

However, the manipulated variable set at the time of open loop control (O/P) is in accordance with the idealistic characteristics of the driving system of the driven target. Therefore, when the manipulated variable is used to actually control the motor, the driving velocity of the driven target becomes sometimes high and sometimes low, due to variation, etc. of the characteristics of the driving system.

As shown in FIG. 20B, when the driving velocity of the driven target becomes higher than the expected velocity locus, the control is switched from the open loop control (O/P) to the feedback control (F/B). The manipulated variable of the motor is calculated to decelerate the driven target, resulting in that the motor (and the driven target) may be stopped.

Once the driven target is stopped as such, no pulse edge is inputted from the encoder. Similar to the case at the time of driving the motor at a low velocity, the stopped state continues and a mechanical error of the driving system is eventually found.

It would be desirable that the drive of the motor can be resumed, even if the motor is temporarily stopped at the low velocity driving and at the accelerated driving of the motor, which is feedback controlled based on the pulse outputted from the encoder.

SUMMARY

In one aspect of the present invention, a motor control method is provided in which a cycle between at least one of leading edges and trailing edges of a pulse signal is measured. The pulse signal is outputted from a pulse signal generator which generates a pulse signal every time a driven target is driven for a specified distance by a motor. A driving velocity of the driven target is calculated from the measured edge cycle. A manipulated variable of the motor is calculated such that the calculated driving velocity corresponds to a specified target velocity, and the motor is driven and controlled based on the manipulated variable. When no output of edges from the pulse signal generator continues for and over a specified replacement determination time while the motor is driven and controlled, the calculated driving velocity is replaced with a specified set velocity that is lower than the target velocity.

In another aspect of the present invention, a motor control device is provided which includes a pulse generator, a velocity calculator, a driving controller, and a velocity selector. The pulse generator generates a pulse signal every time a driven target is driven for a specified distance by a motor. The velocity calculator measures a cycle between at least one of leading edges and trailing edges of the pulse signal outputted from the pulse signal generator, and calculates a driving velocity of the driven target from the measured edge cycle. The driving controller calculates a manipulated variable of the motor such that the calculated driving velocity corresponds to a specified target velocity and drives and controls the motor based on the manipulated variable. The velocity selector replaces the driving velocity with a specified set velocity that is lower than the target velocity, when no output of the edges from the pulse signal generator continues for and over a specified replacement determination time while the motor is driven and controlled.

BRIEF DESCRIPTION OF THE DRAWINGS

The invention will now be described below, by way of example, with reference to the accompanying drawings, in which:

FIGS. 20A and 20B are diagrams illustrating problems in a device of prior art.

DETAILED DESCRIPTION OF THE PREFERRED EMBODIMENT

Figure 1:
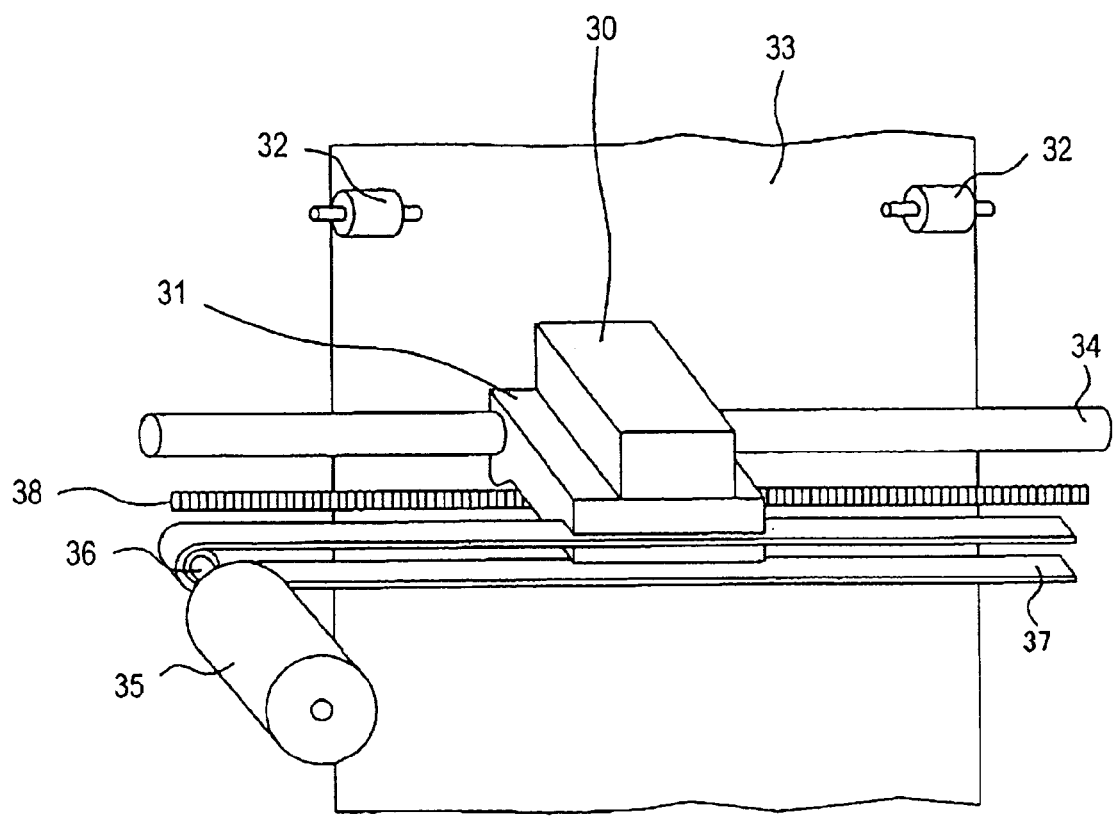
FIG. 1 is an explanatory view showing a schematic structure of a carriage driving mechanism which constitutes a printer of an embodiment.

Referring to FIG. 1, an ink jet printer (hereafter, referred to as a "printer") comprises a carriage driving mechanism. In the carriage driving mechanism shown in FIG. 1, a recording head 30 mounted on a carriage 31 performs recording by ejecting an ink toward a recording sheet 33 from a nozzle. The recording sheet 33 is conveyed by retainer rollers 32. A guide shaft 34 is provided in a width direction of the recording sheet 33. The carriage 31 is slidably supported by the guide shaft 34.

A carriage motor (CR motor) 35 is provided on one end of the guide shaft 34. Between a pulley 36 of the CR motor 35 and an idle pulley (not shown) provided on the other end of the guide shaft 34, an endless belt 37 is held along the guide shaft 34. The carriage 31 is connected to the endless belt 37. That is, the carriage 31 is designed to move back and forth in a width direction of the recording sheet 33 along the guide shaft 34 by a driving force of the CR motor 35 transmitted via the endless belt 37. The CR motor 35 is constituted from a direct current motor.

A timing slit 38 is provided below and along the guide shaft 34. Slits having a certain interval therebetween are formed on the timing slit 38. A detector (not shown) is provided in a lower part of the carriage 31. The detector is composed of a photo interrupter in which a light emitting element and a light receiving element are arranged to face each other. The timing slit 38 is positioned between the light emitting element and the light receiving element. The detector and the timing slit 38 together constitute a later-explained linear encoder 39 (see FIG. 3).

Figure 2:
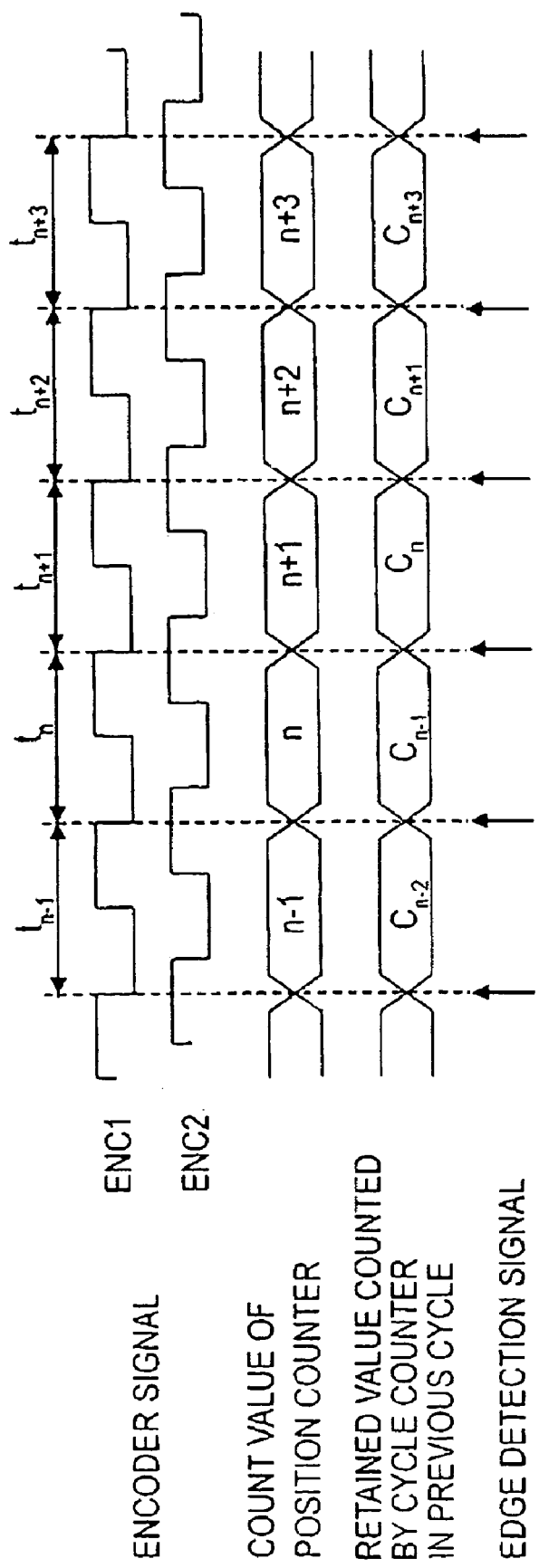
FIG. 2 is an explanatory diagram illustrating encoder signals and operation of a circuit which processes the signals.

As shown in FIG. 2, the detector constituting the linear encoder 39 outputs two types of encoder signal, ENC1 and ENC2. The phase of ENC1 and the phase of ENC2 are shifted by a fixed cycle (¼ cycles, in the present embodiment). When the carriage 31 is moved in a forward direction, that is, from the home position (the left end position in FIG. 1) to the side of the idle pulley, the phase of ENC1 is advanced ahead of the phase of ENC2 by the fixed cycle.

When the carriage is moved in a reverse direction, that is, from the side of the idle pulley to the home position, the phase of ENC1 is delayed from the phase of ENC2 by the fixed cycle.

In the above carriage driving mechanism, the carriage 31 stands by at the home position set near the side end of the pulley 36 of the guide shaft 34, at a position where the last recording is terminated, or at a specified stop position for maintenance, etc. of the recording head 30. When the recording process is started which drives the recording head 30 to form an image on the recording sheet 33, the carriage 31 is accelerated so as to reach a constant target driving velocity before arriving at a predetermined recording start position from a driving start position (i.e., stop position), as in the conventional device previously described. Then, the carriage 31 is moved at the target driving velocity till it reaches a predetermined recording termination position (deceleration start position). After passing the deceleration start position, the carriage 31 is decelerated to be stopped at a target stop position.

When stopped at the home position or at the specified stop position for maintenance, or when using a reflective optical sensor (not shown) provided in the carriage 31 and detecting the positions of both ends of the recording sheet 33 so as to face the recording sheet 33, the carriage 31 is driven (moved) at a velocity lower than the velocity at the time of forming an image.

In order to move the carriage 31 as above, a carriage drive control device is provided in the printer.

Figure 3:
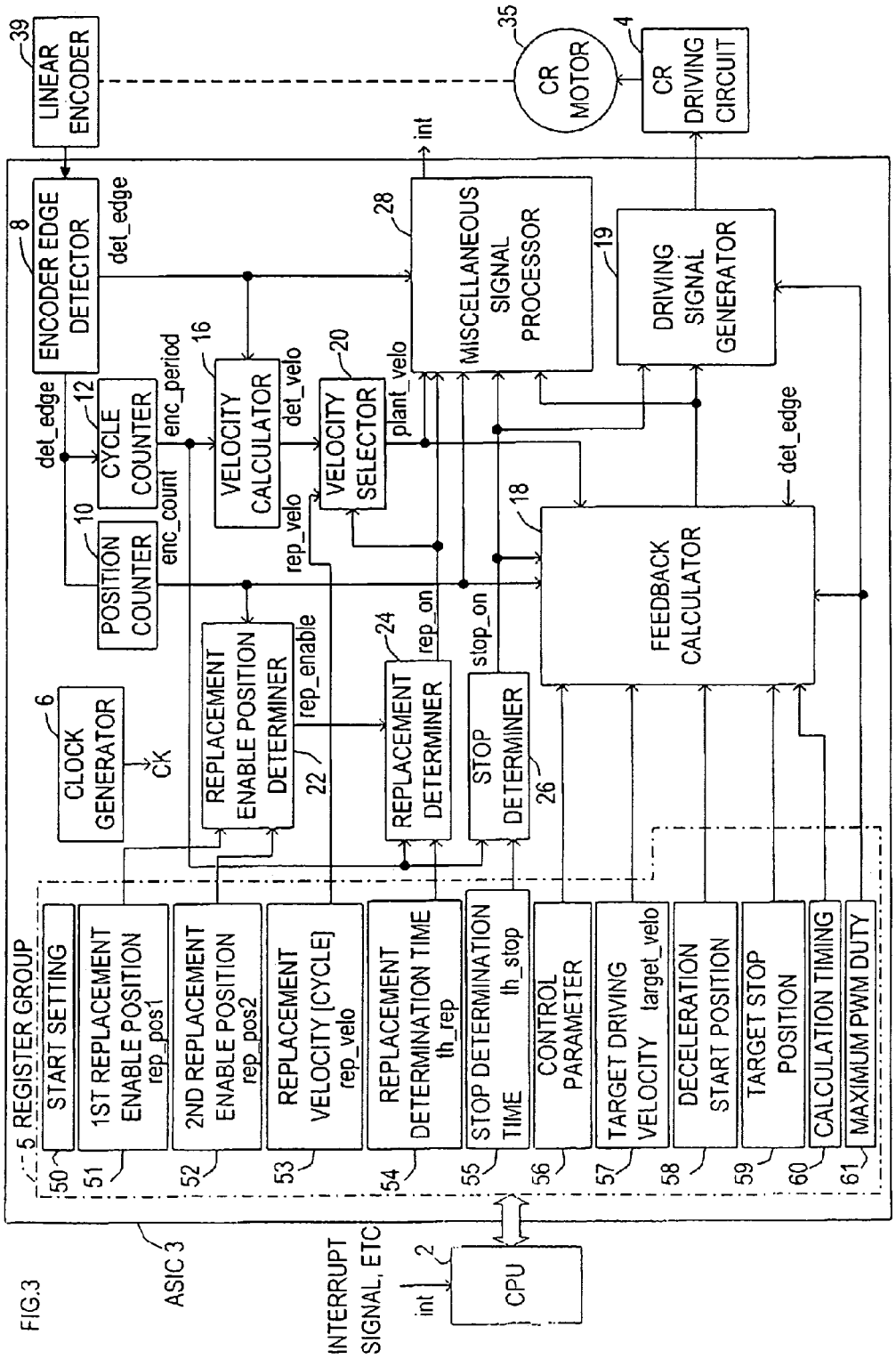
FIG. 3 is a block diagram showing a structure of a control device (ASIC) which drives a carriage.

As seen in FIG. 3, the carriage drive control device is for driving the CR motor 35. The CR motor 35 actuates the carriage 31 in response to directions from a CPU 2 that controls the overall printer. The carriage drive control device comprises an ASIC (Application Specific Integrated Circuit) 3 and a carriage driving circuit (CR driving circuit) 4. The ASIC 3 generates PWM (Pulse Width Modulation) signal for controlling the rotation velocity and rotation direction of the CR motor 35. The CR driving circuit 4 drives the CR motor 35 based on the PWM signal generated by the ASIC 3.

The CR driving circuit 4 is a known H-bridge circuit having four switching elements (e.g., elements including FET: Field-Effect Transistors) and four flywheel diodes which are connected in parallel to the respective switching elements. The CR driving circuit 4 turns on/off the switching elements in receipt of external signal (PWM signal) so as to control current to the CR motor 35.

The ASIC 3 includes an operation mode setting register group 5 that stores various parameters for use in controlling the CR motor 35 by the operation of the CPU 2.

The operation mode setting register group 5 includes a start setting register 50, replacement control setting registers (51 to 54), a stop determination time setting register 55, feedback control setting registers (56 to 60), a maximum PWM duty setting register 61, etc. The start setting register 50 is used to start the CR motor 35. The replacement control setting registers (51 to 54) are used to set parameters required for replacing the driving velocity (detection velocity: det_velo) of the carriage 31 detected via the linear encoder 39 with a predetermined replacement velocity (rep_velo), when the carriage 31 is stopped while the CR motor 35 is driven (particularly, driven at a low velocity or accelerated), and executing replacement control that restarts the CR motor 35. The stop determination time setting register 55 is used to set a stop determination time (th_stop) required for determining the stop of the carriage 31. The feedback control setting registers (56 to 60) are used to set parameters required for feedback controlling the CR motor 35 according to the position and velocity of the carriage 31. The maximum PWM duty setting register 56 is used to set a maximum duty ratio of the PWM signal (maximum PWM duty) for use in driving the CR motor 35.

The replacement control registers are constituted from a first replacement enable position register 51, a second replacement enable position register 52, a replacement velocity (cycle) setting register 53 and a replacement determination time setting register 54, etc. The first replacement enable position register 51 and second replacement enable position register 52 are used to respectively set a control start position (first replacement enable position) and a control termination position (second replacement enable position). A region between the control start position and the control termination position is the region where the replacement control should be executed, out of all the traveling regions of the carriage 31, when the CR motor 35 is driven to move the carriage 31 in one scanning direction. The replacement velocity setting register 53 is used to set a replacement velocity (rep_velo) for use in replacing the detection velocity (det_velo) detected from an edge interval of an input pulse from the linear encoder 39. The replacement determination time setting register 54 is used to set a replacement determination time (th_rep) required for determining whether the detection velocity (det_velo) be replaced with the replacement velocity (rep_velo).

The feedback control setting registers are constituted from a control parameter setting register 56, a target driving velocity setting register 57, a deceleration start position setting register 58, a target stop position setting register 59, a calculation timing setting register 60, etc. The control parameter setting register 56 is used to set a control gain, a control constant, etc. required for feedback controlling the CR motor 35. The target driving velocity setting register 57 is used to set a target driving velocity (target_velo) of the carriage 31. The deceleration start position setting register 58 is used to set a position where deceleration control is started after the constant drive of the carriage 31. The target stop position setting register 59 is used to set a target stop position of the carriage 31. The calculation timing setting register 60 is used to set calculation timing for calculating a manipulated variable of the CR motor 31.

The above respective parameters are written to the respective setting registers by the CPU 2. The CPU 2 is designed to write to the replacement determination time setting register 54 the replacement determination time (th_rep) which is set shorter than the stop determination time (th_stop) written to the stop determination time setting register 665. The CPU 2 is also designed to write to the replacement velocity setting register 53 the replacement velocity (rep_velo) which is set lower than the target driving velocity (target_velo) of the carriage 31 written to the target driving velocity setting register 57.

Other than the operation mode setting register group 5, the ASIC 3 includes a clock generator 6, an encoder edge detector 8, a position counter 10, a cycle counter 12, a velocity calculator 16, a feedback calculator 18, a driving signal generator 19, a velocity selector 20, a replacement enable position determiner 22, and a replacement determiner 24, a stop determiner 26, and a miscellaneous signal processor 28. The clock generator 6 generates a clock signal CK of which cycle is substantially shorter than the encoder signals ENC1 and ENC 2 from the linear encoder 39, and supplies the clock signal CK to the respective portions of the ASIC 3. The encoder edge detector 8 detects the position and the moving velocity of the carriage 31 based on the encoder signals ENC1 and ENC2 from the linear encoder 39. The feedback calculator 18 calculates the manipulated variable of the CR motor 35 based on results of the detection of the encoder edge detector 8, the position counter 10, the cycle counter 12, and the velocity calculator 16, and the parameters set in the feedback control setting registers (56 to 60). The driving signal generator 19 generates a PWM signal for driving the CR motor 35 at a duty ratio in accordance with the manipulated variable calculated in the feedback calculator 18. The velocity selector 20 sets one of the moving velocity (detection velocity: det_velo) of the carriage 31 calculated by the velocity calculator 16 and the replacement velocity (rep_velo) set in the replacement velocity setting register 53, as a moving velocity (plant_velo) used for a control by the feedback calculator 18. The stop determiner 26 determines whether the carriage 31 is completely stopped. The miscellaneous signal processor 28 processes and outputs to the CPU 2 various signals generated in the ASIC 3 such as a result of determination by the stop determiner 26.

The encoder edge detector 8 takes in the encoder signals ENC1 and ENC2 shown in FIG. 2 so as to detect an edge indicating the start/end of each cycle of the encoder signal ENC1 (in the present embodiment, an edge of ENC1 when ENC2 is at a high level) and a rotation direction of the CR motor 35 (a forward direction if an edge detection signal is a leading edge of ENC1, and a reverse direction if the edge detection signal is a trailing edge of ENC1) The edge detection signal (det_edge) is outputted to the position counter 10, the cycle counter 12, the velocity calculator 16, and the miscellaneous signal processor 28.

The position counter 10 detects which slit from the home position the carriage 31 is located by incrementing (in case of the forward direction) or decrementing (in case of the reverse direction) a count value (enc_count) of the edge detection signal according to the rotation direction of the CR motor 35 (i.e., the traveling direction of the carriage 31) detected by the encoder edge detector 8. The count value (enc_count) is outputted to the feedback calculator 18 and the replacement enable position determiner 22.

The cycle counter 12 is initialized every time the edge detection signal (det_edge) is inputted from the encoder edge detector 8. The cycle counter 12 counts the clock signal CK so as to measure the time elapsed after the input of the edge detection signal. The count value (enc_period) showing the result of the measurement is outputted to the velocity calculator 16, the replacement determiner 24, and the stop determiner 26.

The velocity calculator 16 calculates, in synchronization of the edge detection signal (det_edge), the moving velocity (detection velocity: det_velo (=reso/enc_period)) of the carriage 31, based on a physical resolution of the linear encoder 39 (reso: a distance between the slits of the timing slit 38) and a retained value Cn−1 of the count value (enc_period) counted by the cycle counter 12 in the previous cycle of the encoder signal ENC1.

The replacement enable position determiner 22 compares the count value (enc_count) indicating the position of the carriage 31 outputted from the position counter 10, and the first replacement enable position (rep_pos1 and the second replacement enable position (rep_pos2) set in the first and second replacement enable position setting registers 51 and 52. The replacement enable position determiner 22 determines whether the carriage 31 is positioned between the two replacement enable positions, and outputs to the replacement determiner 24 a replacement enable flag (rep_enable) showing the result of the determination.

The replacement determiner 24, when the value 1 is set in the replacement enable flag (rep_enable) outputted from the replacement enable position determiner 22 (more particularly, when the carriage 31 is located between the two replacement enable positions), compares the count value (enc_period) by the cycle counter 12 and the replacement determination time (th_rep) set in the replacement determination time setting register 54. The replacement determiner 24 determines whether a time during which no edge of an encoder signal is detected by the encoder edge detector 8 continues for and over the replacement determination time (th_rep), and outputs to the velocity selector 20 and the miscellaneous signal processor 28 a replacement flag (rep_on) showing the result of the determination.

The velocity selector 20, when the value 1 is set in the replacement flag (rep_on) inputted from the replacement determiner 24 (more particularly, when no edge of an encoder signal is detected for over the replacement determination time), determines that the carriage 31 is stopped, and outputs to the feedback calculator 18 and the miscellaneous signal processor 28 the replacement velocity (rep_velo) as the moving velocity (plant_velo) of the carriage 31. When the value 0 is set in the replacement flag (rep_on), the velocity selector 20 determines that the carriage 31 is normally driven, and outputs to the feedback calculator 18 and the miscellaneous signal processor 28 the detection velocity (det_velo) outputted from the velocity calculator 16 as the moving velocity (plant_velo) of the carriage 31.

The stop determiner 26 compares the count value (enc_period) from the cycle counter 12 and the stop determination time (th_stop) set in the stop determination time setting register 55 so as to determine whether the time during which no edge of an encoder signal is detected by the encoder edge detector 8 continues for and over the stop determination time (th_stop). If the time during which no edge of the encoder signal is detected continues for and over the stop determination time (th_stop), the stop determiner 26 determines that the carriage 31 is completely stopped and that the carriage 31 cannot be moved even if the moving velocity (plant_velo) of the carriage 31 is changed by the velocity selector 20. The stop determiner 26 sets the value 1 to a stop flag (stop_on) to be outputted to the feedback calculator 18 and the miscellaneous signal processor 28.

In the feedback calculator 18, during the time from when the start directions for starting the drive control of the CR motor 35 are set in the start setting register 50 by the CPU 2 until the stop of the carriage 31 is determined by the stop determiner 26 and the value 1 is set in the stop flag (stop_on), a manipulated variable of the CR motor 35 is calculated based on the parameters set in the feedback control registers (66 to 60), the counter value (enc_count) of the position counter 10, the moving velocity (plant_velo) from the velocity selector 20, and the edge detection signal (det_edge) from the encoder edge detector 8.

In other words, the feedback calculator 18, when the start directions are set in the start setting register 50, sets a manipulated variable for accelerating the carriage 31 from the current stop position along a specified velocity locus as shown in FIG. 20B. The feedback calculator 18 sets the manipulated variable multiple times in synchronization with the edge detection signal (det_edge). Then, per calculation timing having a fixed cycle set in the calculation timing setting register 60, the feedback calculator 18 calculates the manipulated variable for feedback controlling the moving velocity (plant_velo) to the target driving velocity (target_velo), based on the moving velocity (plant_velo) from the velocity selector 20, the target driving velocity (target_velo) set in the target driving velocity setting register 56, and a control parameter set in the control parameter setting register 56.

While performing the feedback calculation of the manipulated variable, the feedback calculator 18 determines whether the position of the carriage 31 obtained based on the count value (enc_count) from the position counter 10 has reached the deceleration start position set in the deceleration start position setting register 68. When it is determined that the carriage 31 has reached the deceleration start position, the feedback calculator 18 calculates the manipulated variable necessary for stopping the carriage 31 at the target stop position set in the target stop position setting register 59 at subsequent calculation timings.

As a result, when the carriage 31 is accelerated to the target driving velocity to be driven at a constant velocity and reaches the deceleration start position, the driving signal (PWM signal) of the CR motor 35 necessary for decelerating and stopping the carriage 31 at the target stop position is outputted from the driving signal generator 19. The CR motor 35 is driven and controlled according to the driving signal.

The maximum PWM duty set in the maximum PWM duty setting register 61 is taken into the feedback calculator 18 and the driving signal generator 19. The maximum PWM duty is used as a maximum value when these portions generate the manipulated variable of the CR motor 35 and the driving signal (PWM signal), respectively.

As explained in the above, in the carriage driving control device of the present embodiment, when the time (that is, the latest counter value (enc_period) from the cycle counter 12) during which no edge detection signal (det_edge) is outputted from the encoder edge detector 8 while the CR motor 35 is driven continues for and over the replacement determination time (th_rep), the replacement velocity (rep_velo) set by the CPU 2 is set as the moving velocity (plant_velo) of the carriage for use in the drive control of the CR motor 35, instead of the detection velocity (det_velo) from the velocity calculator 16.

Figure 4:
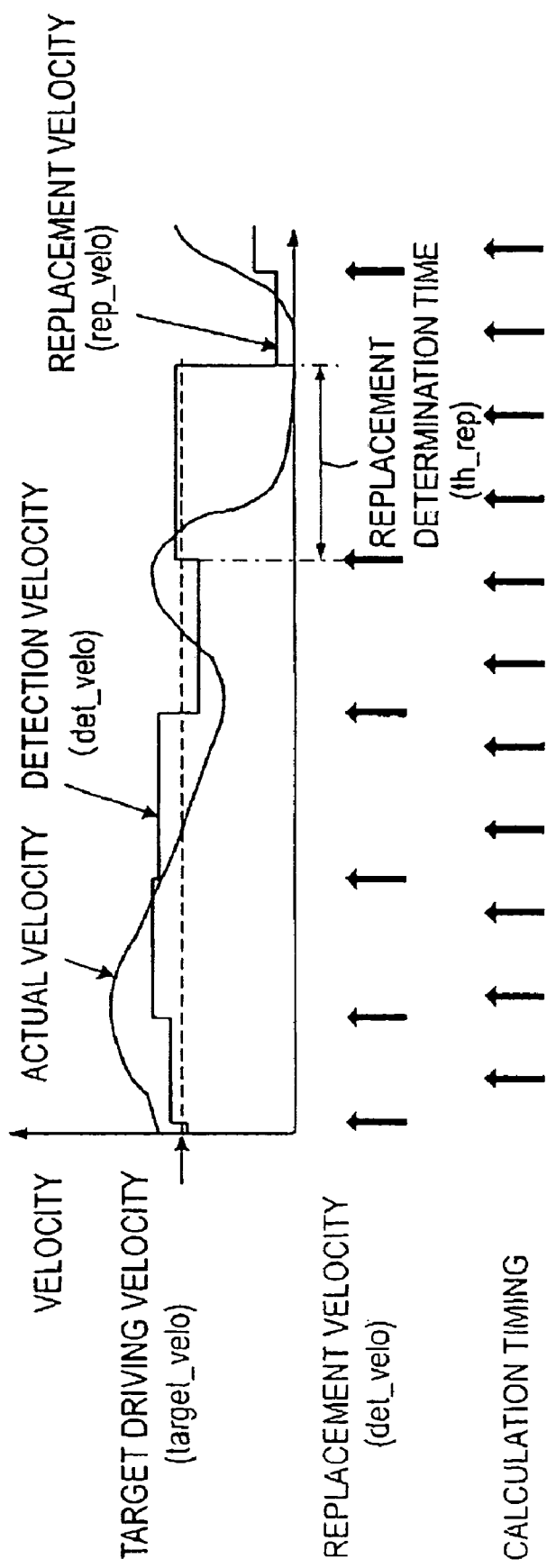
FIG. 4 is an explanatory diagram illustrating operation of a control device of an embodiment.

Therefore, as shown in FIG. 4, if the detection velocity (det_velo) becomes higher than the target driving velocity (target_velo), while the CR motor 35 is driven and controlled at the detection velocity (det_velo) calculated by the velocity calculator 16, the CR motor 35 is decelerated, resulting in that the rotation of the CR motor 35 is stopped (or substantially stopped) and no edge detection signal (det_edge) is outputted from the encoder edge detector B. When such a state of the CR motor 35 continues for over the replacement determination time (th_rep), the moving velocity (plant_velo) of the carriage 31 used for the control is replaced with the replacement velocity (rep_velo) which is lower than the target driving velocity (target_velo). As a result, the CR motor 35 is controlled to generate a driving force. Accordingly, the present embodiment allows the drive of the carriage 31 to be resumed without producing a stopped state, even though the rotation of the CR motor 35 while driven and controlled is temporarily decreased.

Also in the present embodiment, the replacement determiner 24 that determines whether the moving velocity (plant_velo) of the carriage 31 be switched from the detection velocity (det_velo) to the replacement velocity (rep_velo) is operated only when the carriage 31 is located in a region between the first replacement enable position (rep_pos1) and the second replacement enable position (rep_pos2). If the carriage 31 is located in the other regions, the detection velocity (det_velo) is directly selected as the moving velocity (plant_velo). Therefore, by setting a region where the carriage 31 (and the CR motor 35) is easy to stop due to load fluctuation, etc. between the first replacement enable position (rep_pos1) and the second replacement enable position (rep_pos2), it is possible to reduce probability of mistakenly switching the moving velocity (plant_velo) of the carriage 31 from the detection velocity (det_velo) to the replacement velocity (rep_velo) (that is, probability of occurrence of erroneous replacement control).

It is not necessary to limit the region allowing the replacement control to just one region as above. A plurality of regions may be set, out of the whole traveling regions of the carriage 31.

Also in the present embodiment, the stop determination time (th_stop) is set longer than the replacement determination time (th_rep). When the time (i.e., the latest count value (enc_period) from the cycle counter 12) during which no edge detection signal (det_edge) is outputted from the encoder edge detector 8 is no less than the stop determination time (th_stop), it is determined that the carriage 31 is completely stopped and the drive control of the CR motor 35 is ended.

Accordingly, it is possible to prevent the CR motor 35 from being kept driven when the carriage 31 has reached the target stop position, or when the power transmission system has failed between the CR motor 35 and the carriage 31.

In the above, one embodiment of the present invention is described. However, the present invention is not limited to the above described embodiment. The present invention can be practiced in various manners without departing from the technical scope of the invention.

Now, a number of variations are described below, in which part of the above embodiment is respectively modified.

(First Variation)

In the above embodiment, the ASIC 3 is used for detecting the moving velocity and position of the carriage 31, calculating a manipulated variable of the CR motor 35, generating a PWM signal, etc. However, the above-described components of the ASIC 3 can be respectively implemented by mans of a PLD (Programmable Logic Device), for example, or can be implemented as a process of the CPU 2 or of a microcomputer other than the CPU 2.

The first variation uses a microcomputer to implement the functions of the feedback calculator 18, the stop determiner 26, the position counter 10, the velocity calculator 16, the replacement enable position determiner 22, the replacement determiner 24, and the velocity selector 20, among the aforementioned components of the ASIC 3. One example of the process steps performed by the microcomputer will be explained by way of flowcharts shown in FIGS. 5 to 10.

Figure 5:
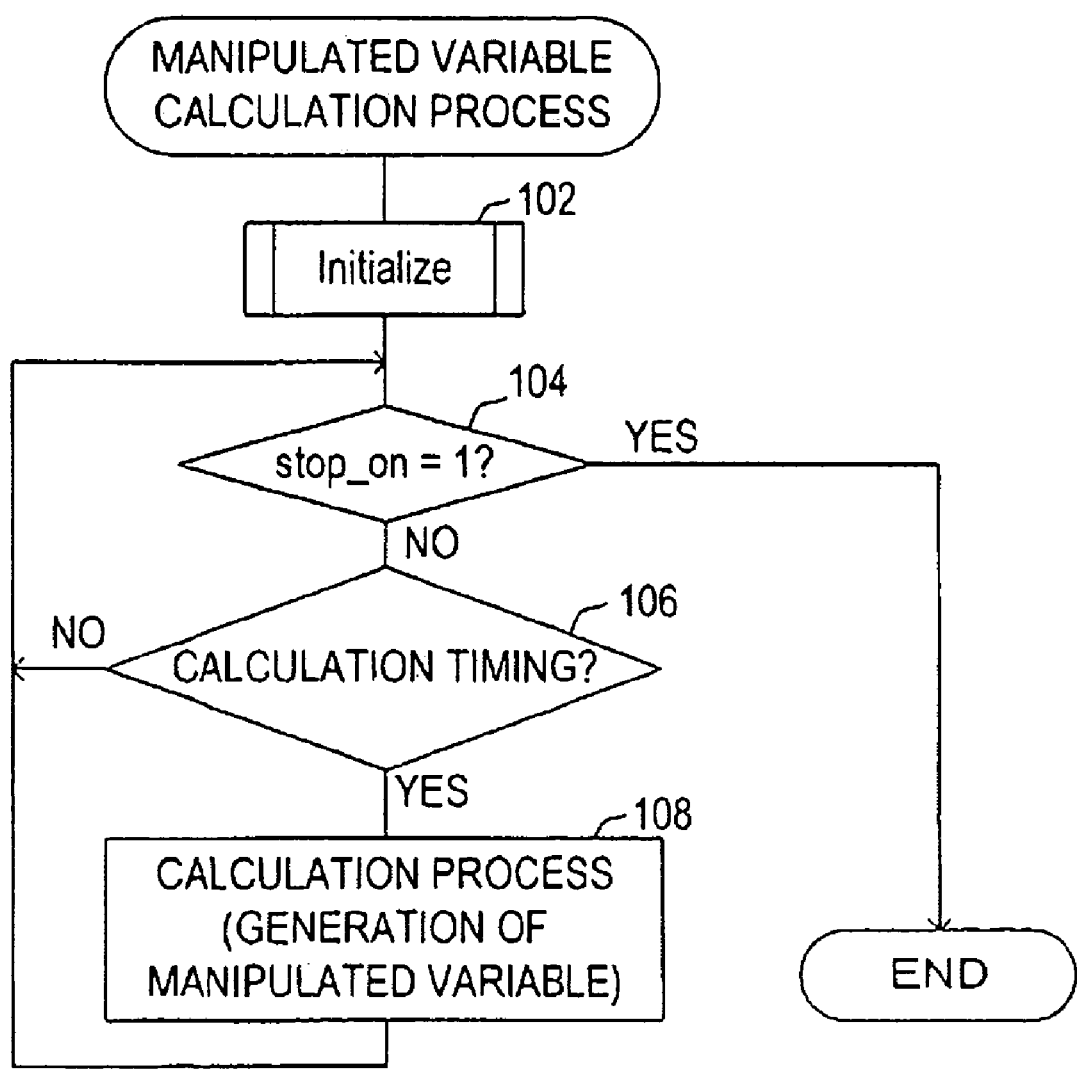
FIG. 5 is a flowchart showing a manipulated variable calculation process of a first variation.

FIG. 5 is a flowchart showing a manipulated variable calculation process which enables a microcomputer to function as the feedback calculator 18.

The manipulated variable calculation process is a process started when directions to start driving the carriage 31 are inputted. When the process is started, initialization is performed in S102 ('S' corresponds to 'Step') of various parameters for the drive control (control parameters like control gain, target driving velocity, deceleration stop position, target stop position, etc.) of the CR motor 35. In S104, it is determined whether the value 1 is set in the stop flag (stop_on).

If the value 1 is not set in the stop flag (stop_on), the process moves to S106 to determine whether it is now the timing for calculating a manipulated variable. If it is not now the timing for calculating a manipulated variable, the process returns to S104.

If determined in S106 that it is now the timing for calculating a manipulated variable, the process moves to S108 to calculate the manipulated variable of the CR motor 35 required for driving the carriage 31 at the target driving velocity (target_velo), based on the various parameters initially set in S102, the moving velocity of the carriage 31 (plant_velo) calculated in a later-explained process, and the count value (enc_count) indicating the position of the carriage 31. The process moves to S104.

When determined that the stop flag (stop_on) is reset in S104, the present manipulated variable calculation process is ended, it being assumed that the carriage 31 is in a complete stop and the CR motor 35 is no longer to be driven.

Figure 6:
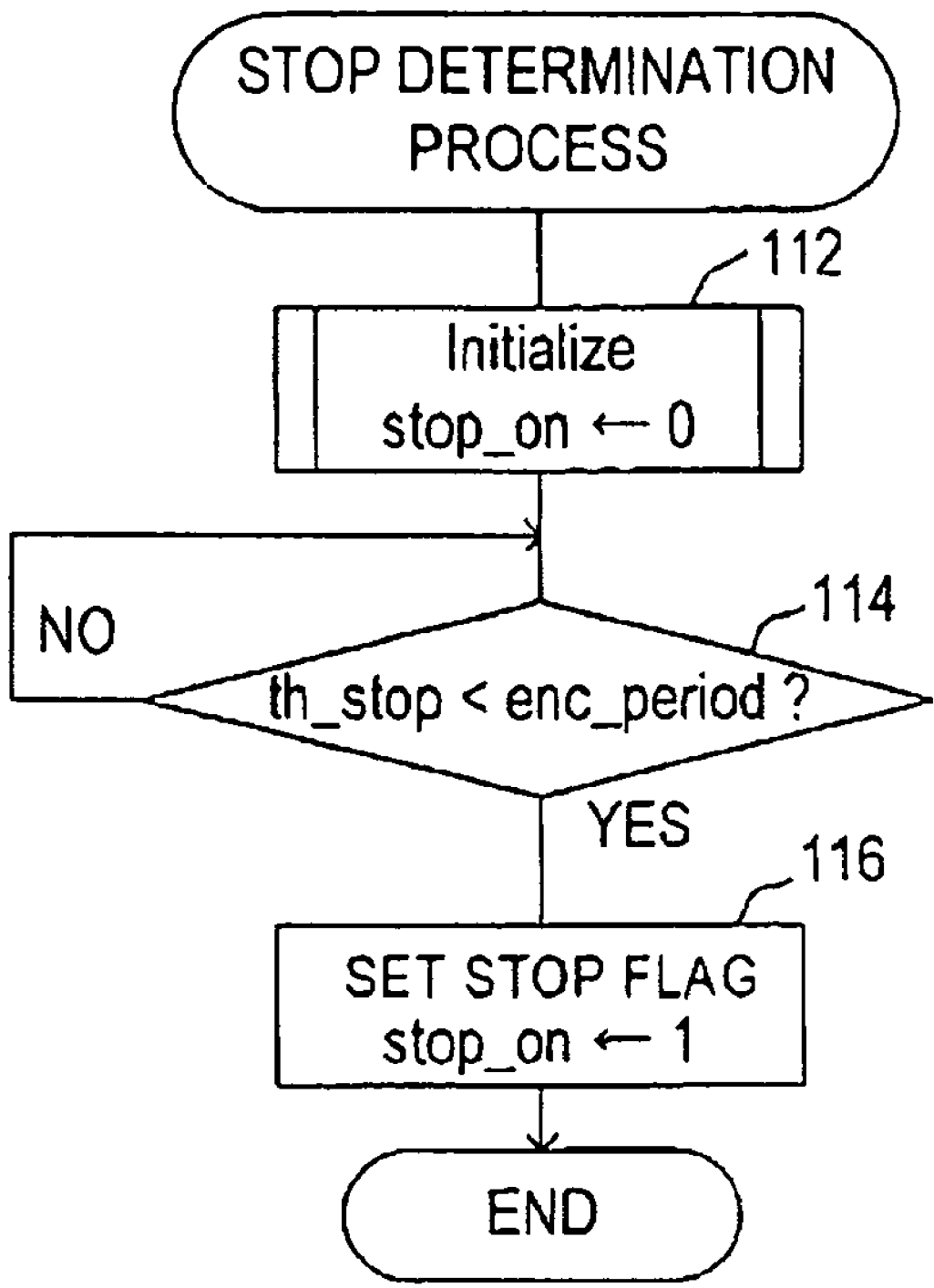
FIG. 6 is a flowchart showing a stop determination process of the first variation.

FIG. 6 is a flowchart showing a stop determination process which enables a microcomputer to function as the stop determiner 26.

The stop determination process is a process started when directions to start driving the carriage 31 are inputted, as is the manipulated variable calculation process. When the process is started, initialization is performed in S112 which resets the stop flag (stop_on) to the value 0. The process moves to S114 to compare the count value (enc_count) from the cycle counter 12 with a predetermined stop determination time (th_stop).

If determined that the count value (enc_count) from the cycle counter 12 is no more than the stop determination time (th_stop), S114 is repeated until the count value (enc_count) from the cycle counter 12 exceeds the stop determination time (th_stop). When the count value (enc_count) exceeds the stop determination time (th_stop), it is assumed that the carriage 31 has come to a complete stop. The process moves to S116 to set the value 1 to the stop flag (stop_on) and end the stop determination process.

Figure 7:
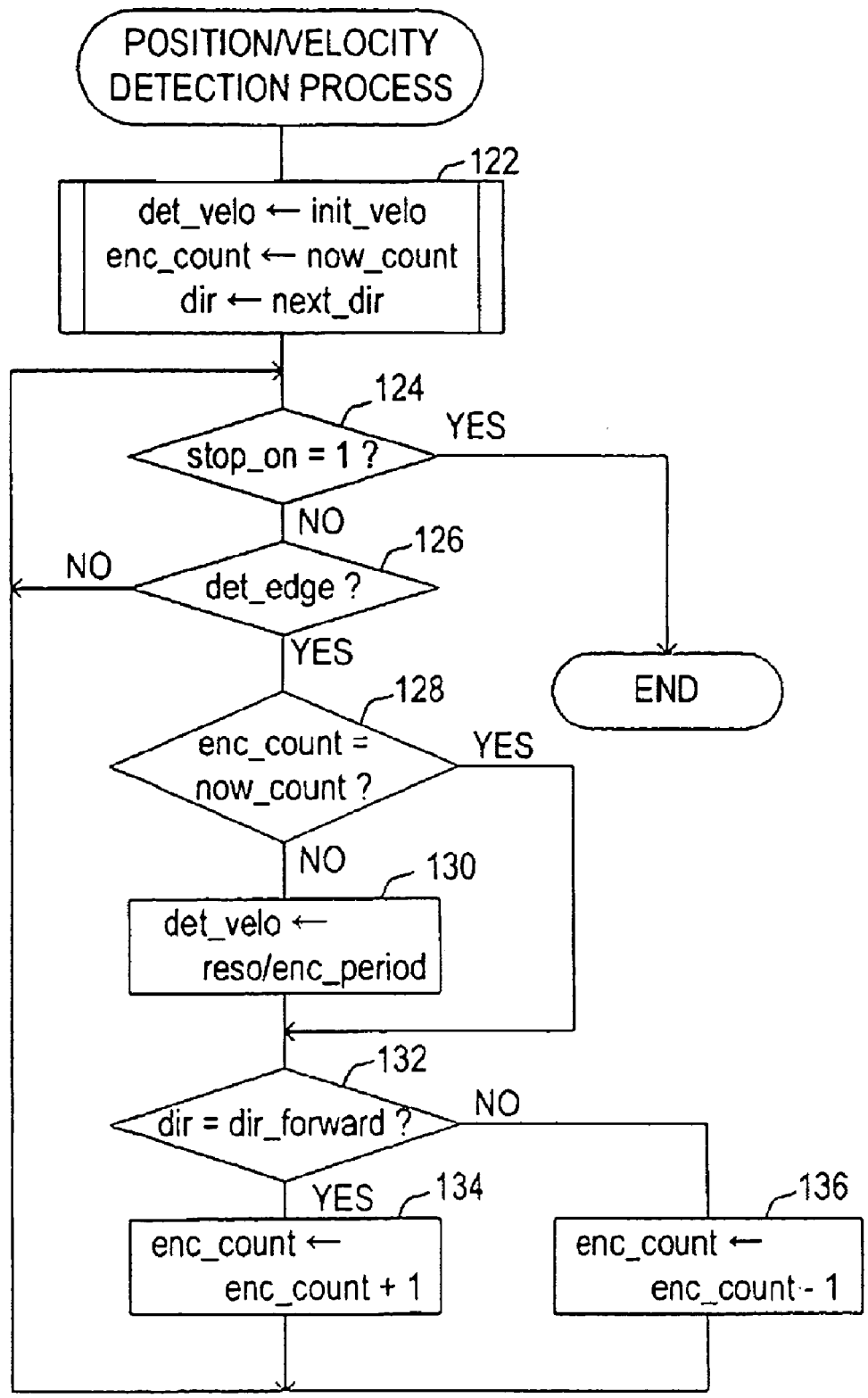
FIG. 7 is a flowchart showing a position/velocity detection process of the first variation.

FIG. 7 is a flowchart showing a position/velocity detection process which enables a microcomputer to function as the position counter 10 and the velocity calculator 16.

The position/velocity detection process is also a process started when directions to start driving the carriage 31 are inputted, as are the aforementioned respective processes: When the process is started, initialization is performed in S122 which sets the initial values (init_velo, now_count, next_dir) respectively to the detection velocity (det_velo), the count value (enc_count) indicating the position of the carriage 31, and a direction parameter (dir) indicating the moving direction of the carriage 31. The initial value (init_velo) of the detection velocity (det_velo) indicates the stop of the carriage 31. The initial value (now_count) of the count value (enc_count) indicates the count value when the drive of the CR motor 35 is stopped last time. The initial value (next_dir) of the position parameter (dir) indicates the driving direction in which the carriage 31 is to be driven.

When the initialization in S122 is finished, the process moves to S124 to determine whether the value 1 is set in the stop flag (stop_on). If the value 1 is not set in the stop flag (stop_on), the process moves to S126. Otherwise, it is determined that the drive control of the CR motor 35 is completed. The present position/velocity detection process is ended.

In S126, it is determined whether an edge detection signal (det_edge) is outputted from the encoder edge detector 8. If no edge detection signal (det_edge) is outputted from the encoder edge detector 8, the process returns to S124. Otherwise, the process moves to S128 to determine whether the count value (enc_count) indicating the position of the carriage 31 coincides with the initial value (now_count) used for the initialization in S122, i.e., whether the detected edge is the first detected edge after the present process is started.

If determined in S128 that the count value (enc_count) coincides with the initial value (now_count), the process moves directly to S132. The actual moving distance of the carriage cannot be known since the detected edge is the first detected edge after the present process is started. Calculation of the velocity does not make sense.

If determined in S128 that the count value (enc_count) does not coincide with the initial value (now_count), the moving velocity (detection velocity: det_velo) of the carriage 31 is calculated in S130, using a given computing equation "det_velo=reso/enc_period", wherein reso is the physical resolution of the linear encoder 39 and enc_period is the count value counted by the cycle counter 12 during a period from when an edge detection signal (det_edge) is outputted last time till when an edge detection signal (det_edge) is outputted the present time, from the encoder edge detector 8. The process moves to S132.

In S132, it is determined whether the direction parameter (dir) initialized in S122 and later updated in the encoder edge detector 8 is a value (dir_forward) indicating a forward movement of the carriage 31.

If the direction parameter (dir) is the value (dir_forward) indicating a forward movement of the carriage 31, the count value (enc_count) indicating the position of the carriage 31 is incremented by 1 in S134. The process moves to S124. Otherwise (i.e., if the carriage 31 is moved in a backward direction), the count value (enc_count) indicating the position of the carriage 31 is decremented by 1 in S136. The process moves to S124.

Figure 8:
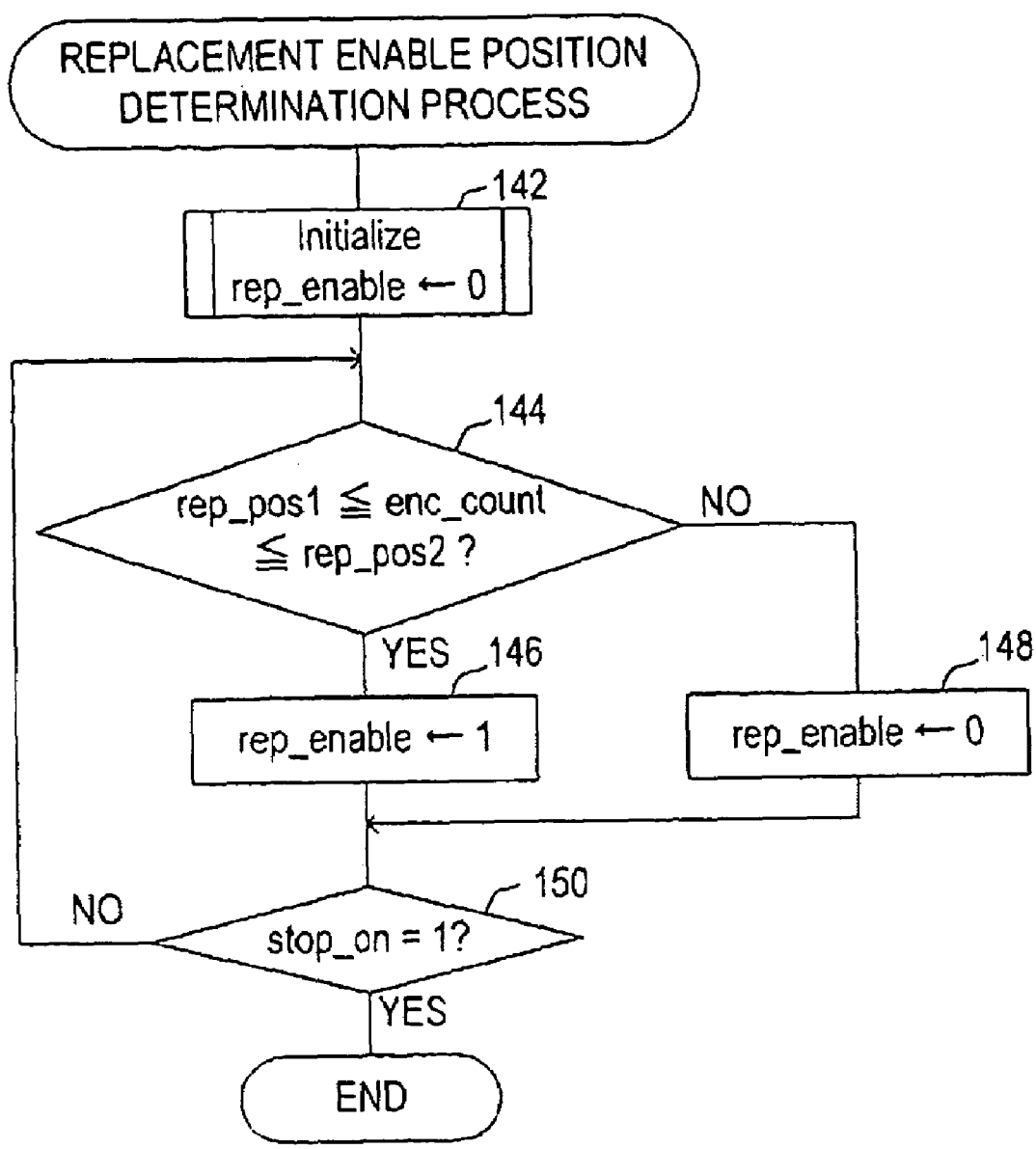
FIG. 8 is flowchart showing a replacement enable position determination process of the first variation.

FIG. 8 is flowchart showing a replacement enable position determination process which enables a microcomputer to function as the replacement enable position determiner 22.

The replacement enable position determination process is also a process started when directions to start driving the carriage 31 are inputted, as are the aforementioned respective processes. When the process is started, initialization is performed in S142 which resets the replacement enable flag (rep_enable) to the value 0. The process moves to S144 to determine whether the count value (enc_count) indicating the position of the carriage 31 is between the predetermined first replacement enable position (rep_pos1) and second replacement enable position (rep_pos2).

If the count value (enc_count) is between the predetermined first replacement enable position (rep_pos1) and second replacement enable position (rep_pos2), the process moves to S146 to set the value 1 to the replacement enable flag (rep_enable). The process moves to S150. Otherwise, the process moves to S148 to reset the replacement enable flag (rep_enab1) to the value 0. The process moves to S150.

In S150, it is determined whether the value 1 is set in the stop flag (stop_on). If the value 1 is not set in the stop flag (stop_on), the process moves to S144. Otherwise, it is determined that the drive control of the CR motor 35 is completed, and the present replacement enable position determination process is ended.

Figure 9:
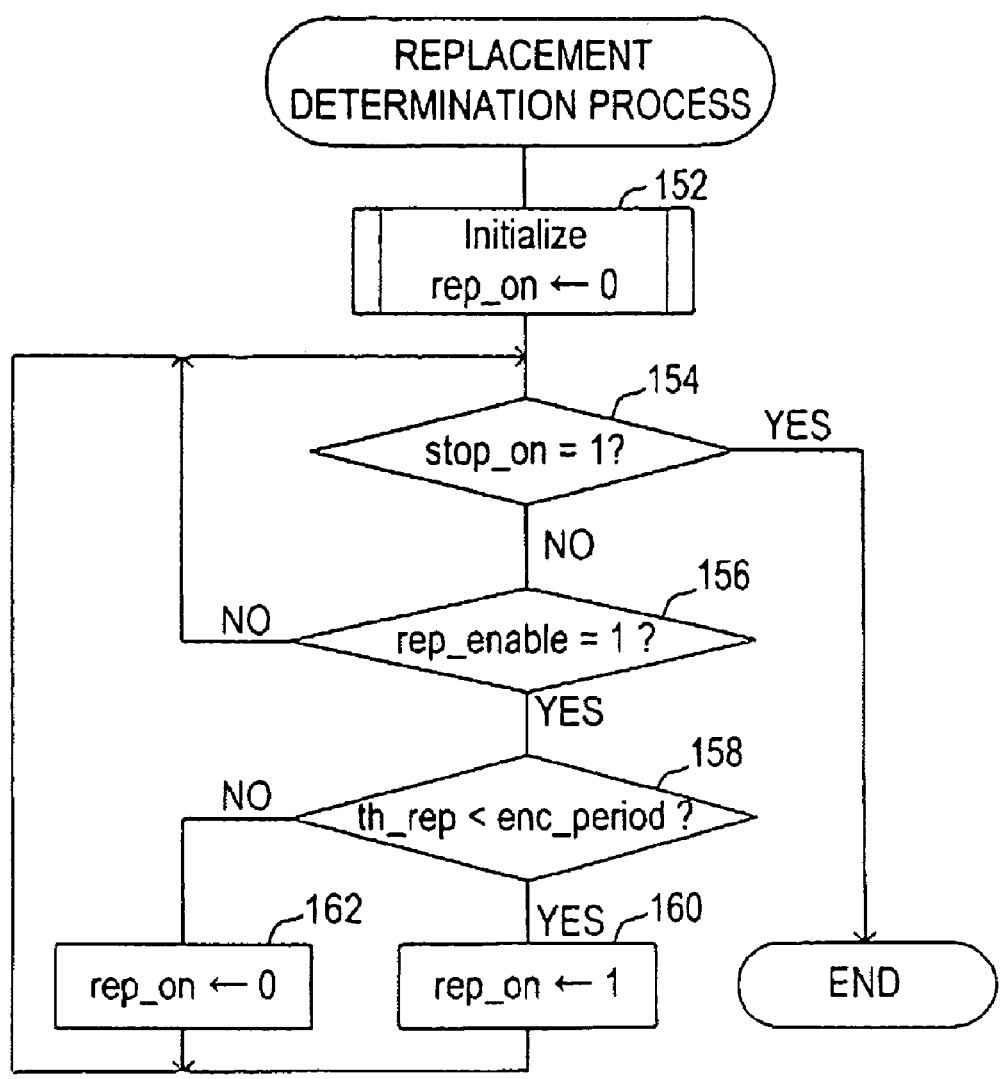
FIG. 9 is a flowchart showing a replacement determination process of the first variation.

FIG. 9 is a flowchart showing a replacement determination process which enables a microcomputer to function as the replacement determiner 24.

The replacement determination process is also a process started when directions to start driving the carriage 31 are inputted, as are the aforementioned respective processes. When the process is started, initialization is performed in S152 which resets the replacement flag (rep_on) to the value 0. The process moves to S154 to determine whether the value 1 is set in the stop flag (stop_on).

If the value 1 is not set in the stop flag (stop_on), the process moves to S156. Otherwise, it is determined that the drive control of the CR motor 35 is completed, and the present replacement determination process is ended.

In S156, it is determined whether the value 1 is set in the replacement enable flag (rep_enable). If the value 1 is not set in the replacement enable flag (rep_enable), the process returns to S154. Otherwise, the process moves to S158 to determine whether the count value (enc_period) from the cycle counter is larger than the predetermined replacement determination time (th_rep).

If the count value (enc_period) is larger than the predetermined replacement determination time (th_rep), i.e., if the time during which no edge of an encoder signal is detected in the encoder edge detector 8 continues for and over the replacement determination time (th_rep), the process moves to S160 to set the value 1 to the replacement flag (rep_on). The process returns to S154. If the count value (enc_period) is not larger than the predetermined replacement determination time (th_rep), the process moves to S162 to reset the replacement flag (rep_on) to the value 0. The process returns to S154.

Figure 10:
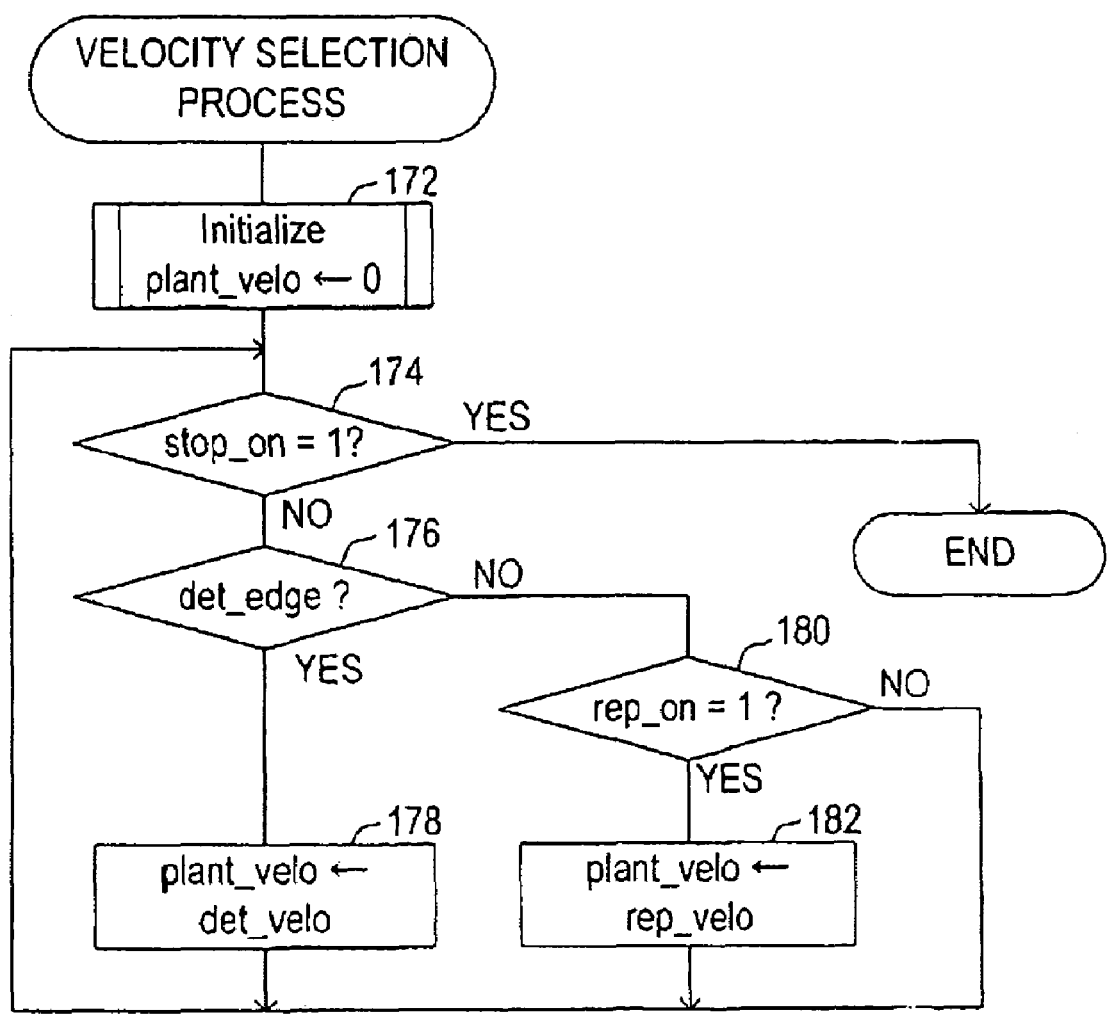
FIG. 10 is a flowchart showing a velocity selection process of the first variation.

FIG. 10 is a flowchart showing a velocity selection process which enables a microcomputer to function as the velocity selector 20.

The velocity selection process is also a process started when directions to start driving the carriage 31 are inputted, as are the aforementioned respective processes. When the process is started, initialization is performed in S172 which sets the initial value of 0 to the moving velocity (plant_velo) of the carriage 31. The process moves to S174 to determine whether the value 1 is set in the stop flag (stop_on).

If the value 1 is set in the stop flag (stop_on), the process moves to S176. Otherwise, it is determined that the drive control of the CR motor 35 is completed, and the present velocity selection process is ended.

In S176, it is determined whether an edge detection signal (det_edge) is outputted from the encoder edge detector 8. If an edge detection signal (det_edge) is outputted from the encoder edge detector 8, the process moves to S178 to set the detection velocity (det_velo), which is calculated based on the count value (enc_period) from the cycle counter 12, as the moving velocity (plant_velo) of the carriage 31. The process moves to S174. Otherwise, the process moves from S176 to S180.

In S180, it is determined whether the value 1 is set in the replacement flag (rep_on). If the value 1 is set in the replacement flag (rep_on), the process moves to S182 to set the predetermined replacement velocity (rep_velo) as the moving velocity (plant_velo) of the carriage 31. The process moves to S174. Otherwise, the process moves directly from S180 to S174.

As explained above, the functions of the feedback calculator 18, the stop determiner 26, the position counter 10, the velocity calculator 16, the replacement enable position determiner 22, the replacement determiner 24, and the velocity selector 20, all shown in FIG. 3, can be executed along the flowcharts shown in FIGS. 5 to 10 by means of a microcomputer. The same effect as in the aforementioned embodiment can be achieved in this manner as well.

(Second Variation)

In the aforementioned embodiment, a fixed value, which is set in the replacement velocity setting register 53 by the CPU 2, is used for the replacement velocity (rep_velo) set as the moving velocity (plant_velo) of the carriage 31 instead of the detection velocity (det_velo). However, the replacement velocity (rep_velo) may be set based on the target driving velocity (target_velo) or the detection velocity (det_velo).

Figure 11:
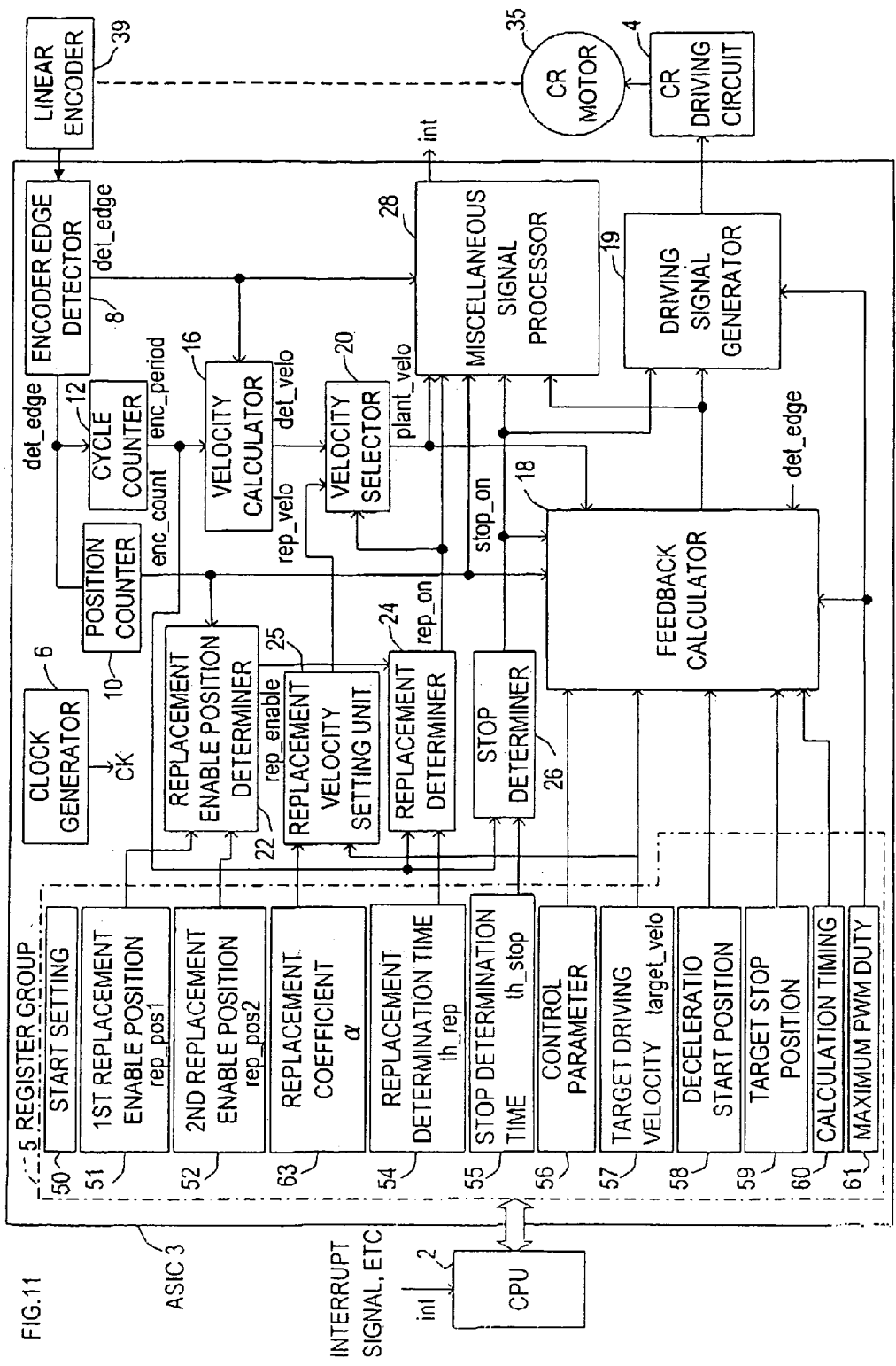
FIG. 11 is a block diagram showing a structure of a control device (ASIC) according to a second variation.

For that purpose, for example, it is preferable to provide a replacement coefficient setting register 63 in the operation mode setting register group 5, instead of the replacement velocity setting register 53, and a replacement velocity setting unit 25 in the ASIC 3, as shown in FIG. 11. The replacement coefficient setting register 63 is used to set a replacement coefficient α from the CPU 2. The replacement velocity setting unit 25 calculates the replacement velocity (rep_velo) using a computing equation "rep_velo=α×target_velo", based on the replacement coefficient α set in the replacement coefficient setting register 63 and the target driving velocity (target_velo) set in the target driving velocity setting register 57.

Figure 12:
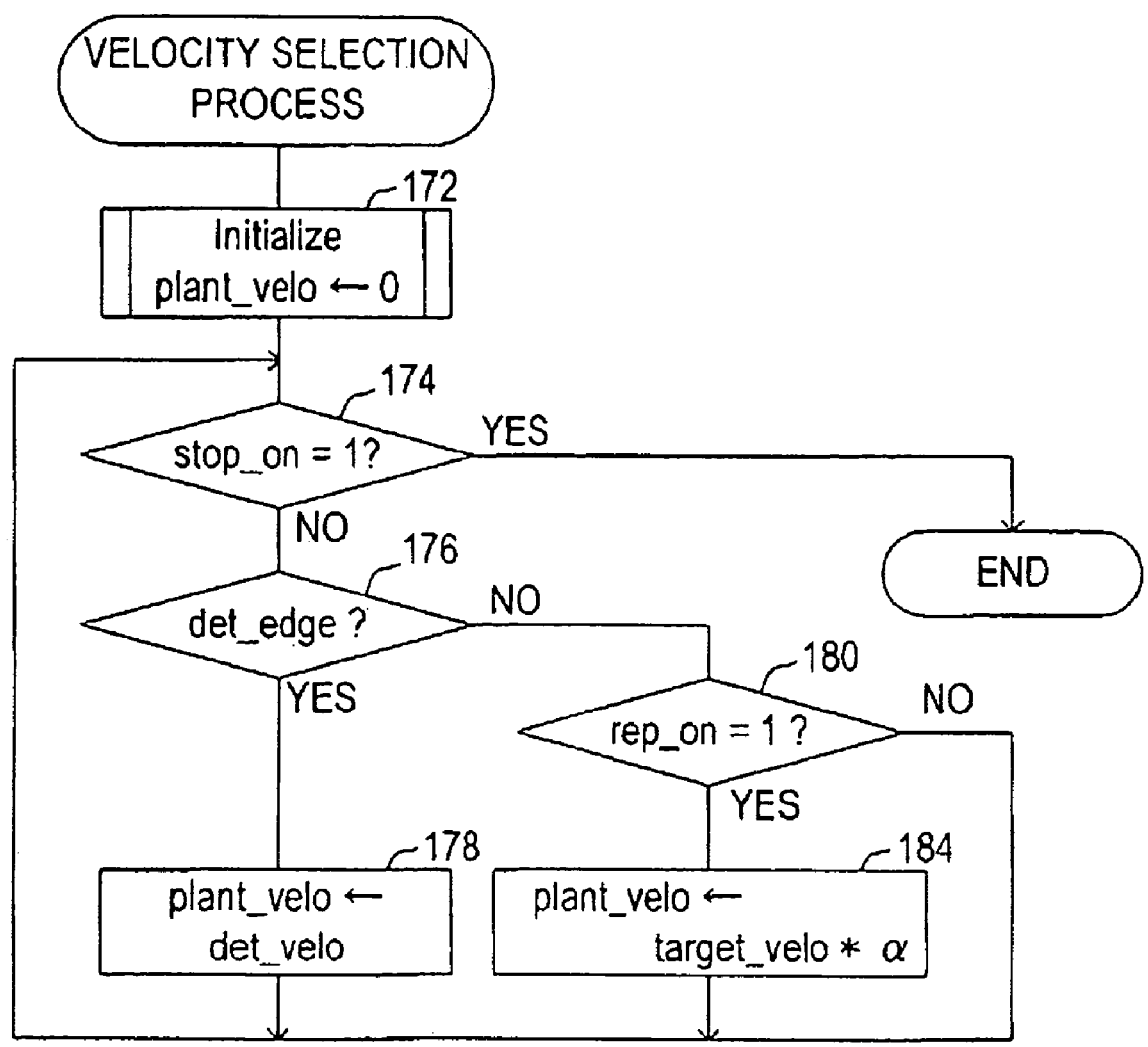
FIG. 12 is a flowchart showing a velocity selection process of the second variation.

In order to enable a microcomputer to function as the replacement velocity setting unit 25, it is preferable that S182 in the velocity selection process shown in FIG. 10 is changed to S184 which directly sets the result of the above computing equation, obtained by multiplying the target driving velocity (target_velo) by the replacement coefficient α (i.e., replacement velocity (rep_velo)), to the moving velocity (plant_velo) of the carriage 31, as shown in FIG. 12.

In order to set the replacement velocity (rep_velo) based on the detection velocity (det_velo), it is preferable that the replacement velocity (rep_velo) is calculated using a computing equation "rep_velo=α×det_velo" in the replacement determiner 24 or in S184.

Even if the replacement velocity (rep_velo) is set based on the target driving velocity (target_velo) or the detection velocity (det_velo), the same effect as in the aforementioned embodiment can be achieved (Third Variation)

In the velocity selection process shown in FIG. 12 in the above second variation, when the value 1 is set in the replacement flag (rep_on) from the replacement determiner 24, the replacement velocity (rep_velo), obtained using the computing equation "rep_velo =α×target_velo", is set as the moving velocity (plant_velo) of the carriage 31, in S184. However, the same effect as in the aforementioned embodiment can be achieved, even if the calculation and replacement operation in S184 is made just once immediately after the value of the replacement flag (rep_on) is changed from 0 to 1.

Figure 13:
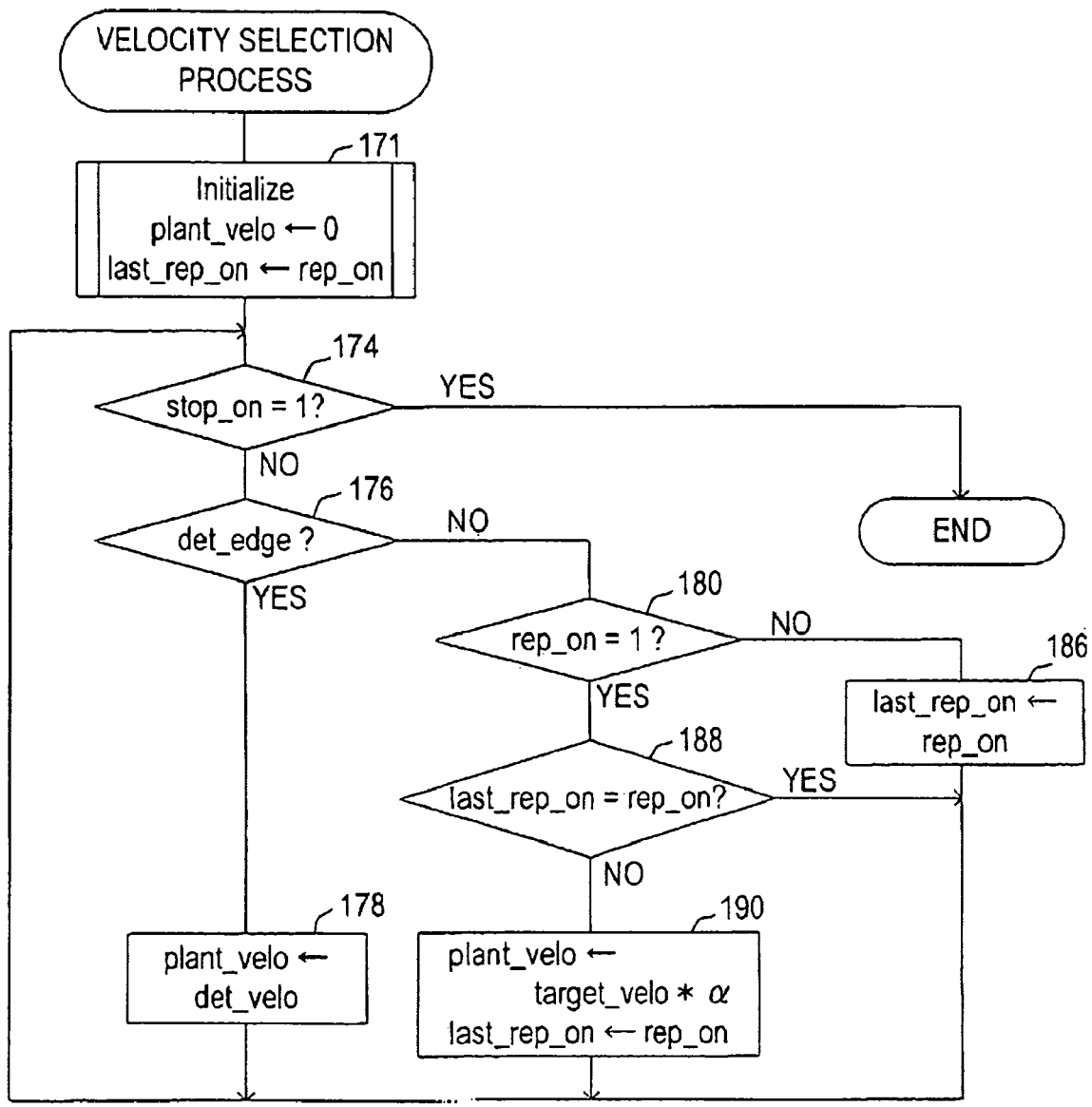
FIG. 13 is a flowchart showing a velocity selection process of a third variation.

In order to effect the above, it is preferable to execute the velocity selection process according to steps shown in FIG. 13.

That is, in the velocity selection process shown in FIG. 13, not only the initial value 0 is set to the moving velocity (plant_velo) in the initialization (S171) executed immediately after the start of the CR motor 35, but the value of the replacement flag (rep_on) at the time is set to the previous value (last-rep_on) of the replacement flag.

When it is determined in S180 that the value 1 is set in the replacement flag (rep_on), it is determined in S188 whether the replacement flag (rep_on) coincides with the previous value (last_rep_on). If the replacement flag (rep_on) does not coincide with the previous value (last-rep_on) (i.e., if the value of the replacement is changed from 0 to 1), a result of the above calculation, obtained by multiplying the target driving velocity (target_velo) by the replacement coefficient α (i.e., replacement velocity (rep_velo)), is set to the moving velocity of the carriage 31 in S190. Also, the value of the current replacement flag (rep_on) is set to the previous value (last_rep_on) of the replacement flag. The process moves to S174.

When it is determined in S188 that the replacement flag (rep_on) coincides with the previous value (last_rep_on), the process moves directly to S174. When it is determined in S180 that the value 1 is not set in the replacement flag (rep_on), the process moves to S186 to set the value of the current replacement flag (rep_on) to the previous value (last-rep_on) of the replacement flag. The process moves to S174.

A velocity selection process shown in FIG. 13 is performed in the same manner as the velocity selection process shown in FIG. 10 or 12.

If the replacement velocity (rep_velo) is calculated just once immediately after the value of the replacement flag (rep_on) is changed from 0 to 1 and is set to the moving velocity (plant_velo) of the carriage 31 as above, the processing load of the device can be reduced.

(Fourth Variation)

In the above embodiment, when an edge detection signal (det_edge) is outputted from the encoder edge detector 8 after the moving velocity (plant_velo) of the carriage 31 is switched from the detection velocity (det_velo) to the replacement velocity (rep_velo), it is determined that the carriage 31 has been managed to be driven and the normal control is resumed which sets the detection velocity (det_velo) as the moving velocity (plant_velo) of the carriage 31. However, even if an edge detection signal (det_edge) is outputted from the encoder edge detector 8, it is not always true that the carriage 31 can be normally driven. Therefore, it is preferable to determine that the carriage 31 has been managed to be driven and the normal control is resumed which sets the detection velocity (det_velo) as the moving velocity (plant_velo) of the carriage 31, after the moving velocity (plant_velo) of the carriage 31 is switched from the detection velocity (det_velo) to the replacement velocity (rep_velo), and when an edge detection signal (det_edge) is outputted several times from the encoder edge detector 8.

Figure 14:
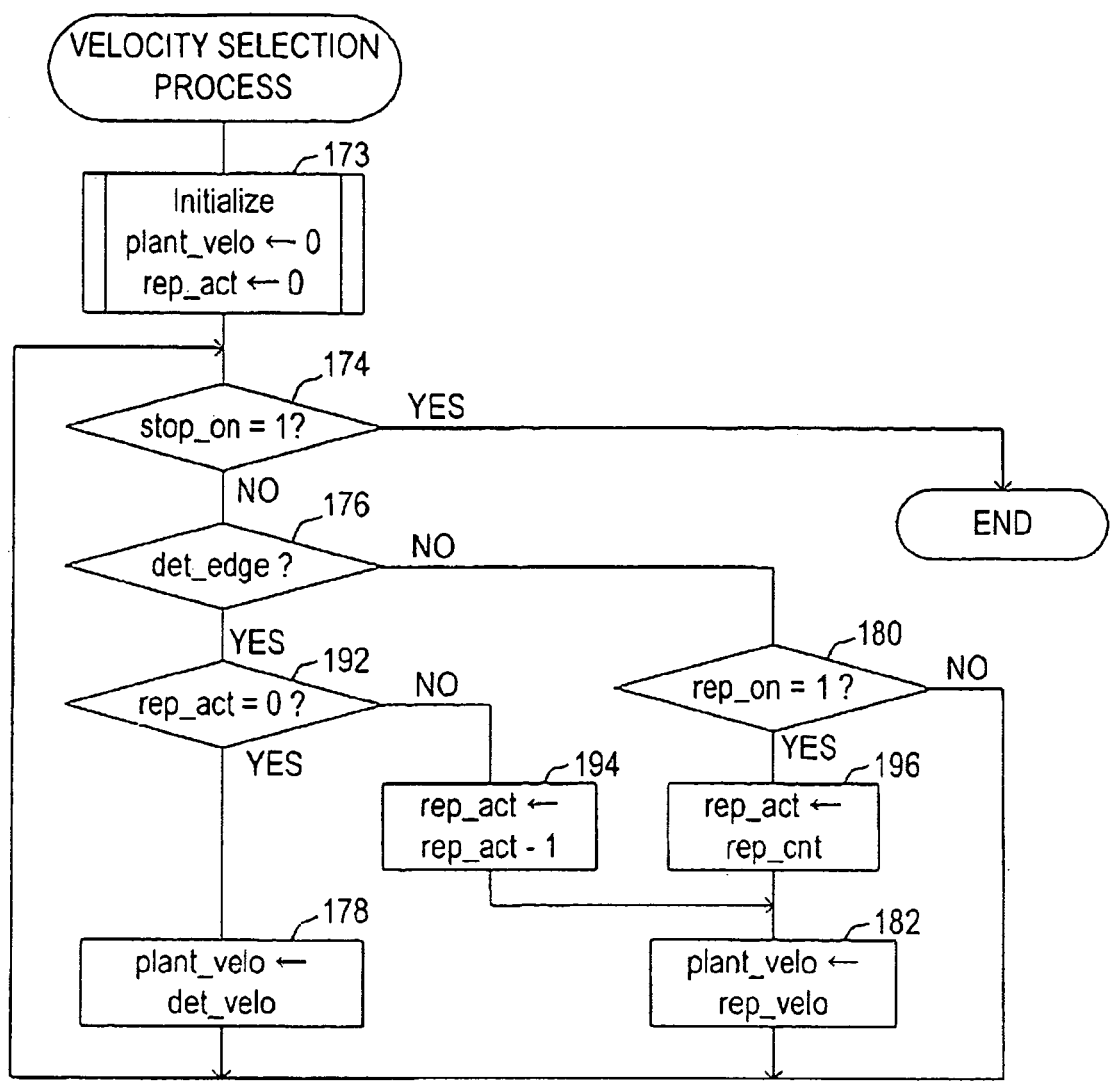
FIG. 14 is a flowchart showing a velocity selection process of a fourth variation.

For the execution of such control, it is preferable to perform the velocity selection process according to steps shown in FIG. 14.

In the velocity selection process shown in FIG. 14, when it is determined in S180 that the value 1 is set in the replacement flag (rep_on), a predetermined initial value (rep_cnt) is set to an edge count value after recovery (rep_act) in S196. The process moves to S182.

When it is determined in S176 that an edge detection signal (det_edge) has been outputted from the encoder edge detector 8, the process moves to S192 to determine whether the edge count value after recovery (rep_act) is the value 0.

If the edge count value after recovery (rep_act) is not the value 0, the edge count value after recovery (rep_act) is decremented by 1 in S194. The process moves to S182. When the edge count value after recovery (rep_act) is the value 0, the process moves to S178.

The velocity selection process shown in FIG. 14 is performed in the same manner as the velocity selection process shown in FIG. 10, except for the above points.

According to the velocity selection process shown in FIG. 14, an integer of 1 or above is set to the initial value (rep_cnt) of the edge count value after recovery (rep_act). After the moving velocity (plant_velo) of the carriage 31 is switched from the detection velocity (det_velo) to the replacement velocity (rep_velo), and after an edge detection signal (det_edge) is outputted several times from the encoder edge detector 8, the normal control can be resumed which sets the detection velocity (det_velo) as the moving velocity (plant_velo) of the carriage 31. The drive of the carriage 31 can be resumed without fail.

In the velocity selection process shown in FIG. 14, the same control as the aforementioned embodiment can be executed by setting the value 0 to the initial value (rep_cnt) of the edge count value after recovery (rep_act).

(Fifth Variation)

In the above embodiment, when the replacement velocity (rep_velo) is set as the moving velocity (plant_velo) of the carriage 31, the replacement velocity (rep_velo) is not changed until an edge detection signal (det_edge) is outputted from the encoder edge detector 8. However, the replacement velocity (rep_velo) may be gradually changed (decreased).

For that purpose, it is preferable to repeatedly perform determination of the replacement determination time (th_rep), a plural number of times, during the period in which output of an encoder detection signal (det_edge) is stopped from the encoder edge detector 8. At each determination, the replacement velocity (rep_velo) is preferably changed. That is, other than the count value (enc_period) from the cycle counter 12, a replacement determination timing counter may be provided to repeatedly measure the replacement determination time (th_rep). Every time the count value (rep_counter) reaches the replacement determination time (th_rep), the replacement flag (rep_on) may be incremented by 1. The replacement velocity (rep_velo) may be set according to the value (1, 2, . . . , n) of the replacement flag (rep_on).

Figure 15:
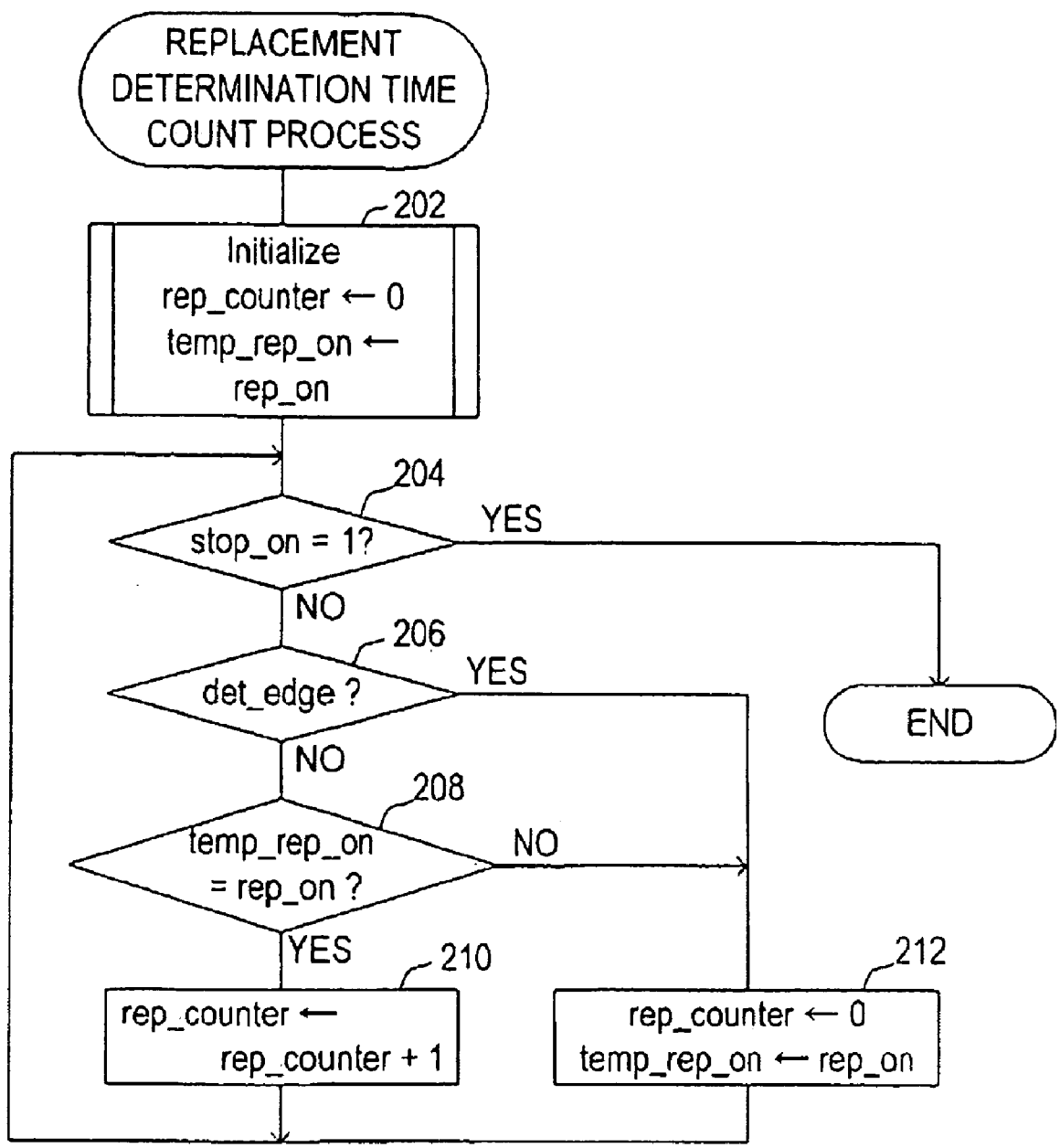
FIG. 15 is a flowchart showing a replacement determination time count process of a fifth variation.
Figure 16:
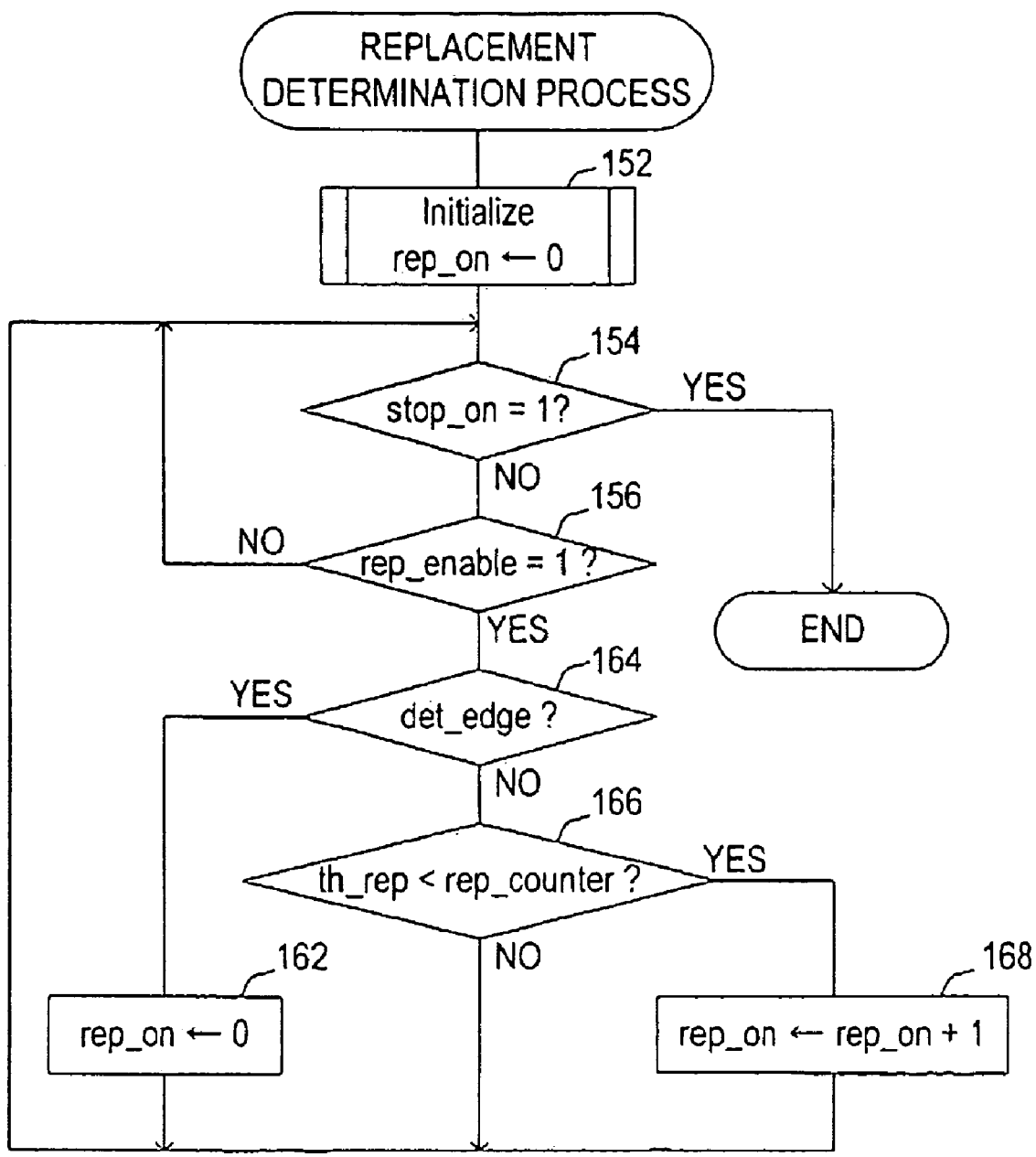
FIG. 16 is a flowchart showing a replacement determination process of the fifth variation.
Figure 17:
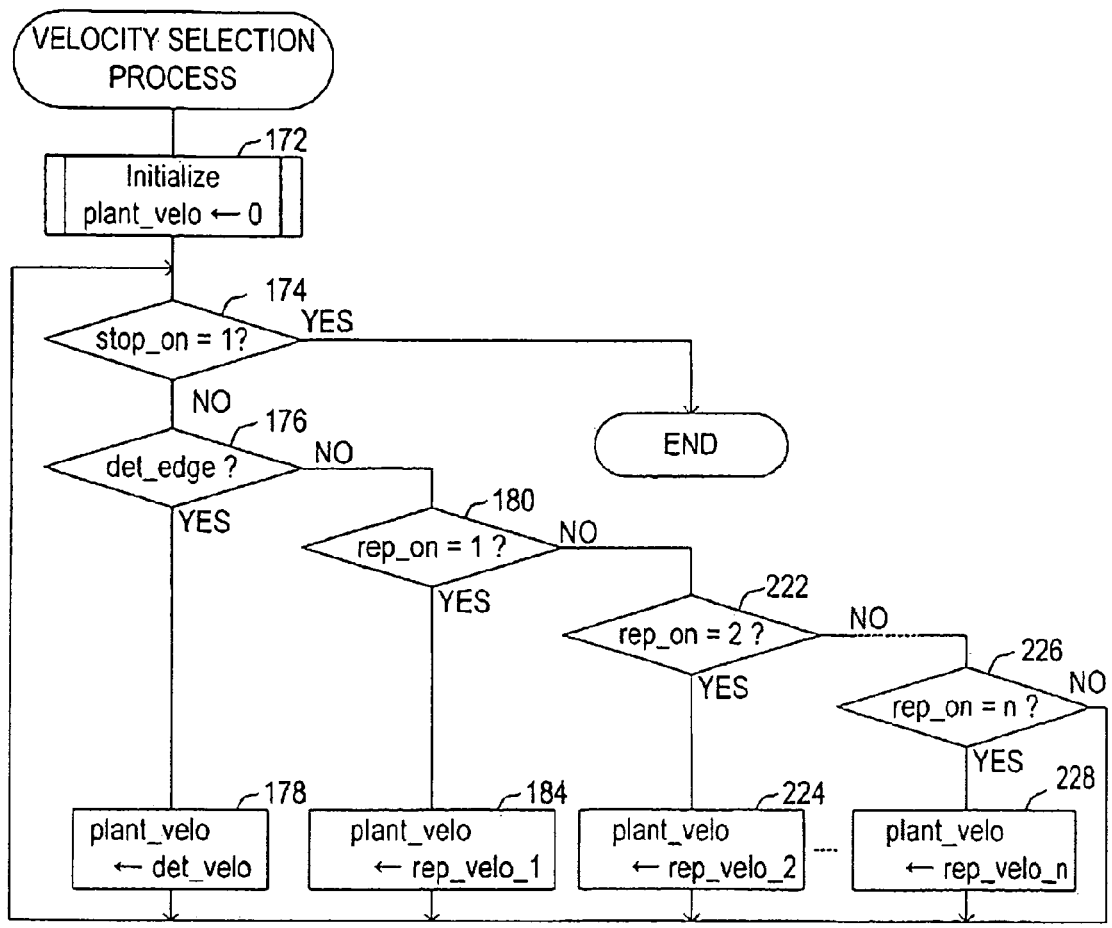
FIG. 17 is a flowchart showing a velocity selection process of the fifth variation.
Figure 18:
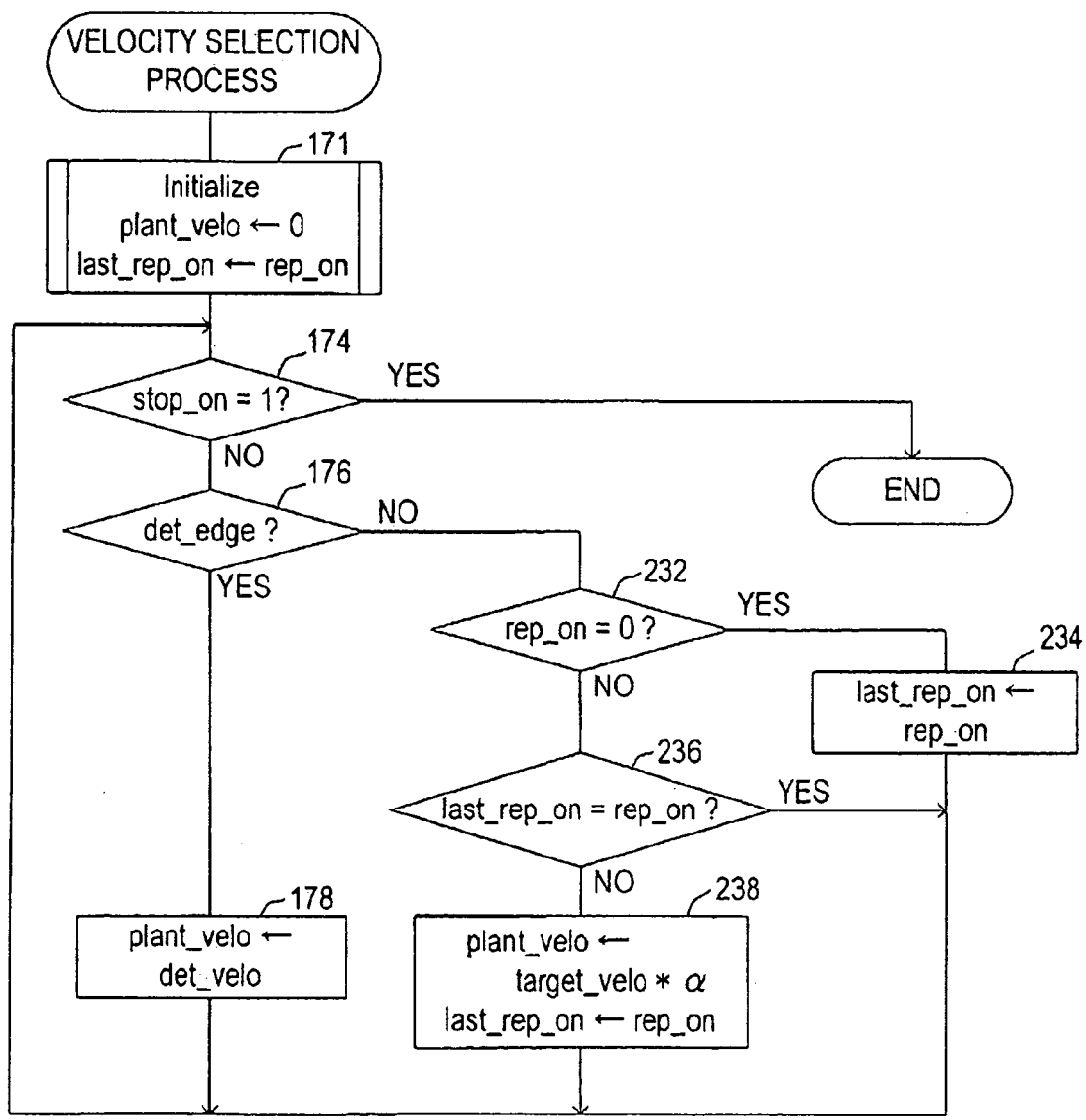
FIG. 18 is a flowchart showing another example of the velocity selection process of the fifth variation.

Particularly, for example, a replacement determination time count process as the replacement determination timing counter may be executed in accordance with a flowchart shown in FIG. 15, the replacement determination process as the replacement determiner 24 may be executed in accordance with a flowchart shown in FIG. 16, and the velocity selection process as the velocity selector 20 may be executed in accordance with a flowchart shown in FIG. 17 or 18.

The processes in the aforementioned flowcharts will be explained below.

First of all, in the replacement determination time count process shown in FIG. 15, initialization is performed in S202 in which the initial value 0 is set to the count value (rep_counter) of the replacement determination timing counter, and the value of the current replacement flag (rep_on) is set to an update determination parameter (temp-rep_on) of the replacement flag (rep_on).

In S204, it is determined whether the value 1 is set in the stop flag (stop_on). If negatively determined in S204, the process moves to S206. Otherwise, it is assumed that the drive control of the CR motor 35 is completed and the present replacement determination time count process is ended.

In S206, it is determined whether an edge detection signal (det_edge) is outputted from the encoder edge detector 8. If an edge detection signal (det_edge) is outputted from the encoder edge detector 8, the process moves to S212 to set the initial value 0 to the count value (rep_counter) of the replacement determination timing counter, and the value of the current replacement flag (rep_on) is set to an update determination parameter (temp-rep_on) of the replacement flag (rep_on), in the same manner as in the initialization performed in S202.

In S206, if determined that no edge detection signal (det_edge) is outputted from the encoder edge detector 8, the process moves to S208 to determine whether the value of the replacement flag (rep_on) coincides with the update determination parameter (temp-rep_on).

If the value of the replacement flag (rep_on) does not coincide with the update determination parameter (temp-rep_on), the aforementioned S212 is performed and the process moves to S204. Otherwise, the process moves to S210 to increment the count value (rep_counter) of the replacement determination timing counter. The process moves to S204.

In the replacement determination process shown in FIG. 16, S152, S154, and S156 are executed as in the replacement determination process shown in FIG. 9. When it is determined in S156 that the value 1 is set in the replacement enable flag (rep_enable), the process moves to S164 to determine whether an edge detection signal (det_edge) is outputted from the encoder edge detector 8. If an edge detection signal (det_edge) is outputted from the encoder edge detector 8, the process moves to S162 to reset the value of the replacement flag (rep_on) to 0. The process moves to S154.

If it is determined in S164 that no edge detection signal (det_edge) is outputted from the encoder edge detector 8 (i.e., the carriage 31 is in a complete stop), the process moves to S166 to determine whether the count, value (rep_counter) of the replacement determination timing counter is larger than the replacement determination time (th_rep).

If the count value (rep_counter) is larger than the replacement determination time (th_rep), the replacement flag (rep_on) is incremented by 1 for update. The process moves to S154. Otherwise the process moves directly from S166 to S154.

That is, in the replacement determination time count process and the replacement determination process shown in FIGS. 15 and 16, the time elapsed is repeatedly measured since an edge detection signal (det_edge) is no longer outputted from the encoder edge detector 8, up to the maximum of the replacement determination time (th_rep). Every time the elapsed time reaches the replacement determination time (th_rep), the replacement flag (rep_on) is updated (incremented) by 1.

A velocity selection process shown in FIG. 17 is a process that sets either the detection velocity (det_velo) or one of a plurality of replacement velocities (rep_velo_1, rep_velo_2, . . . , rep_velo_n) as the moving velocity (plant_velo) of the carriage 31, according to the value (0, 1, 2, . . . , n) of the replacement flag (rep_on) updated as above.

The plurality of replacement velocities (rep_velo_1, rep_velo_2, . . . ; rep_velo_n) are set such that the larger the value of the replacement flag (rep_on) is, the lower the replacement velocity is.

In the velocity selection process shown in FIG. 17, S172, S174, S176, and S178 are sequentially executed in the same manner as in the velocity selection process shown in FIG. 10. In S176, when it is determined that no edge detection signal (det_edge) is outputted from the encoder edge detector 8, the process moves to S180 to determine whether the value 1 is set in the replacement flag (rep_on). If the value 1 is set in the replacement flag (rep_on), the process moves to S184 to set the predetermined first replacement velocity (rep_velo_1) as the moving velocity (plant_velo) of the carriage 31. The process moves to S174.

In S180, when it is determined that the value 1 is not set in the replacement flag (rep_on), the process moves to S222 to determine whether the value 2 is set in the replacement flag (rep_on). If the value 2 is set in the replacement flag (rep_on), the process moves to S224 to set the predetermined second replacement velocity (rep_velo_2) as the moving velocity (plant_velo) of the carriage 31. The process moves to S174.

In S222, when it is determined that the value 2 is not set in the replacement flag (rep_on), the same determination process is sequentially performed to the value n. In each determination process (S226), when it is determined that the value n is set in the replacement flag (rep_on), the $n^{th}$ replacement velocity (rep_velo_n), which is predetermined to correspond to the value of the replacement flag (rep_on), is set as the moving velocity (plant_velo) of the carriage 31. The process moves to S174. Finally, when the value n is not set in the replacement flag (rep_on) (i.e., replacement flag (rep_on)=0), the process moves directly to S174.

Accordingly, in the above velocity selection process, the time during which no edge detection signal (det_edge) is outputted from the encoder edge detector 8 continues for and over the replacement determination time (th_rep), and the replacement velocity (rep_velo_1) is set as the moving velocity (plant_velo). Thereafter, until an edge detection signal (det_edge) is outputted from the encoder edge detector 8, the moving velocity (plant_velo) is sequentially switched to the replacement velocity (rep_velo_2, rep_velo_3, . . . , rep_velo_n) which is lower than the current velocity.

According to the fifth variation, until an edge detection signal (det_edge) is outputted from the encoder edge detector 8 since the stop of the carriage 31 is detected, the driving force of the CR motor 35 can be gradually increased. Torque fluctuation can be inhibited which is caused when the rotation of the CR motor 35 is resumed.

In a velocity selection process shown in FIG. 18 is a process in which the steps of S180 and onwards are changed which are executed when it is determined that no edge detection signal 8 (det_edge) is outputted from the encoder edge detector 8 in S176 of the velocity selection process shown in FIG. 13.

That is, in this velocity selection process, when negatively determined in S176, the process moves to S232 to determine whether the replacement flag (rep_on) is reset to 0. When the replacement flag (rep_on) is reset to 0, the process moves to S234 to set the value of the current replacement flag (rep_on) to the previous value (last_rep_on) of the replacement flag. The process moves to S174.

When it is determined in S232 that the replacement flag (rep_on) is not reset to 0 (i.e., when the replacement flag (rep_on) is equal to any of 1 to n, the process moves to S236 to determine whether the replacement flag (rep_on) coincides with the previous value (last_rep_on).

If the replacement flag (rep_on) does not coincides with the previous value (last_rep_on) (i.e., if the replacement flag (rep_on) is updated), the process moves to S238 to multiply the target driving velocity (target_velo) by the replacement coefficient α, which is set according to the value of the replacement flag (rep_on), to calculate the moving velocity (plant_velo) of the carriage 31. At the same time, the value of the current replacement flag (rep_on) is set to the previous value (last_rep_on) of the replacement flag. The process moves to S174. Otherwise, the process moves directly from S236 to S174.

That is, in the velocity selection process shown in FIG. 18, a different value is set to the replacement coefficient α, which is used for calculating the moving velocity (plant_velo) of the carriage 31 based on the target driving velocity (target_velo), according to the value of the replacement flag (rep_on). In this manner, the moving velocity (plant_velo) of the carriage 31, i.e., replacement velocity (rep_velo), is gradually changed. Even if the velocity selection process is performed as such, the same effect as above can be achieved.

(Sixth Variation)

In the above embodiment, the fixed value set by the CPU 2 is used for the replacement determination time (th_rep). However, the replacement determination time (th_rep) may be calculated based on the count value (enc_period) from the cycle counter 12, i.e., the latest edge cycle.

Figure 19:
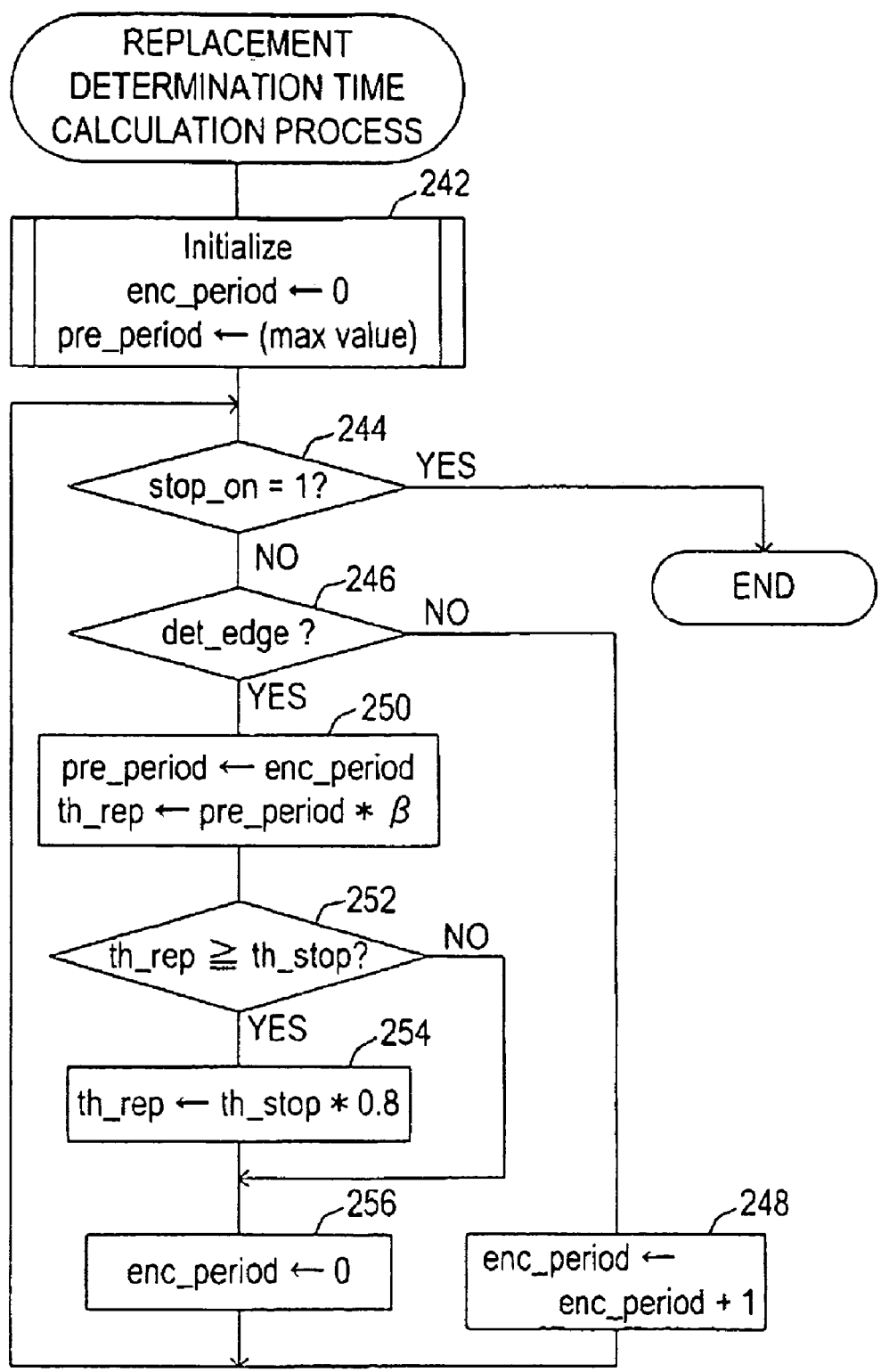
FIG. 19 is a flowchart showing a replacement determination time calculation process of a sixth variation.

In order to calculate the replacement determination time as above, it is preferable that a replacement determination time calculation process is executed according to the steps shown in FIG. 19. This process includes a function of the cycle counter 12.

In the replacement determination time calculation process shown in FIG. 19, initialization is executed in S242 as below. That is, the initial value 0 is set to the count value (enc_period) indicating the time elapsed since the latest edge detection signal (det_edge) is outputted from the encoder edge detector 8, and a predetermined maximum value (max value) is set to the count value (pre_period) indicating an edge cycle from when the previous edge detection signal (det_edge) is outputted from the encoder edge detector 8 until the latest edge detection signal (det_edge) is outputted.

In S244, it is determined whether the value 1 is set in the stop flag (stop_on). If the value 1 is not set in the stop flag (stop_on), the process moves to S246. Otherwise, the present replacement determination time calculation process is ended, it being assumed that the drive control of the CR motor 35 is completed.

In S246, it is determined whether an edge detection signal (det_edge) is outputted from the encoder edge detector 8. If no edge detection signal (det_edge) is outputted from the encoder edge detector 8, the process moves to S248 to increment by 1 the count value (enc_period) indicating the time elapsed after the edge detection. The process moves to S244. Otherwise, the process moves from S246 to S250.

In S250, the count value (enc_period) indicating the time elapsed since the previous edge detection signal (det_edge) is outputted is set to the count value (pre_period) indicating the latest edge cycle. Also, the replacement determination time (th_rep) is calculated by multiplying the count value (pre_period) indicating the latest edge cycle by a predetermined coefficient β (β>1). The process moves to S252.

In S252, it is determined whether the replacement determination time (th_rep) calculated in S250 is no less than the stop determination time (th_stop). If the replacement determination time (th_rep) is no less than the stop determination time (th_stop), the stop determination time (th_stop) is multiplied by a set value smaller than 1 (e.g., 0.8), so that the replacement determination time (th_rep) be shorter than the stop determination time (th_stop). The process moves to S256.

If the replacement determination time (th_rep) is less than the stop determination time (th_stop), the process moves directly from S252 to S256. In S256, the initial value 0 is set to the count value (enc_period). The process returns to S244.

As above, in the replacement determination time calculation process shown in FIG. 19, the replacement determination time (th_rep) is calculated by multiplying the count value (pre_period) indicating the latest edge cycle by the predetermined coefficient β (β>1). Moreover, when the calculated replacement determination time (th_rep) becomes no less than the stop determination time (th_stop), the replacement determination time (th_rep) is re-calculated based on the stop determination time (th_stop) so that the replacement determination time (th_rep) be shorter than the stop determination time (th_stop). Accordingly, it is possible to promptly and highly accurately determine the stop of the carriage 31 (i.e., whether the moving velocity (plant_velo) of the carriage 31 is switched from the detection velocity (det_velo) to the replacement velocity (rep_velo)).

In the replacement determination time calculation process shown in FIG. 19, the replacement determination time (th_rep) is set based on the count value (pre_period) indicating the latest edge cycle. The maximum of replacement determination time (th_rep) is the stop determination time (th_stop). However, when the replacement velocity (rep_velo) is gradually changed as explained in the fifth variation, it is preferable to set a cumulative value of each replacement determination time smaller than the stop determination time.

That is, when the moving velocity (plant_velo) is gradually changed, the stop determination time (th_stop) may be set so that the replacement determination time (th_rep) at the first time is not more than the stop determination time (th_stop), the sum of replacement determination time (th_rep) at the first time and the replacement determination time (th_rep) at the second time is not more than the stop determination time (th_stop), and the sum of replacement determination time (th_rep) at the first time, the replacement determination time (th_rep) at the second time, and the replacement determination time (th_rep) at the third time is smaller than the stop determination time (th_stop).

Additionally, for example, if the cumulative value of each replacement determination time is no less than the stop determination time (th_stop), the replacement determination time (th_rep) at the first time may be re-calculated by a computing formula "th_stop×0.8". The replacement determination time (th_rep) at the second time may be re-calculated by a computing formula "(th_stop−th_rep)×0.8". The replacement determination time (th_rep) at the third time may be re-calculated by a computing formula "(th_stop−th_rep×2)×0.8".

In the above embodiment and variations, the present invention is applied to the driving device of the CR motor 35 for use in moving the carriage 31 in a printer. However, the present invention can be applied to any device which uses an encoder to detect a driving velocity of a driven target such as a motor, and feedback controls the motor so that the driving velocity corresponds to a target velocity.

Also in the above embodiment and variations, the encoder includes a linear encoder, and generates a pulse signal having two phases shown in FIG. 2. However, the encoder may be a rotary encoder. The output pulse from the encoder may have one phase only.

What is claimed is:

1. A motor control method comprising the steps of:
measuring a cycle between at least one of leading edges and trailing edges of a pulse signal outputted from a pulse signal generator that generates a pulse signal every time a driven target is driven for a specified distance by a motor, and calculating a driving velocity of the driven target from the measured edge cycle;
calculating a manipulated variable of the motor such that the calculated driving velocity corresponds to a specified target velocity, and driving and controlling the motor based on the manipulated variable; and
replacing the driving velocity with a specified set velocity that is lower than the target velocity, when no output of edges from the pulse signal generator continues for and over a specified replacement determination time while the motor is driven and controlled.

2. The motor control method according to claim 1, wherein
the set velocity to be replaced with the driving velocity is set based on the target velocity.

3. The motor control method according to claim 1, wherein
the set velocity to be replaced with the driving velocity is set based on the driving velocity previously calculated from the edge cycle.

4. The motor control method according to claim 1, wherein
when no output of edges from the pulse signal generator continues for and over the specified replacement determination time while the motor is driven and controlled, a plurality of set velocities are used to gradually reduce the driving velocity of the driven target.

5. The motor control method according to claim 1, wherein
a period in which the driving velocity can be replaced with the set velocity is limited to a part of one control cycle of the motor from the start to the end of the drive control.

6. The motor control method according to claim 1, wherein
when no output of edges from the pulse signal generator continues for and over the specified replacement determination time while the motor is driven and controlled, it is determined that the motor is stopped to end the drive control of the motor and set a shorter time than the stop determination time to the replacement determination time.

7. The motor control method according to claim 6, wherein
a longer time than the latest edge cycle, which is used to calculate the driving velocity of the driven target, is set to the replacement determination time.

8. The motor control method according to claim 7, wherein
when the replacement determination time which is set based on the edge cycle is no less than the stop determination time, the replacement determination time is modified to a shorter time than the stop determination time.

9. The motor control method according to claim 8, wherein
when the replacement determination time which is set based on the edge cycle is no less than the stop determination time, the replacement determination time is re-set based on the stop determination time so as to be shorter than the stop determination time.

10. The motor control method according to claim 7, wherein
when the replacement determination time set based on the edge cycle is no less than the stop determination time, the stop determination time is modified to a longer time than the replacement determination time.

11. The motor control method according to claim 1, wherein
the set velocity or a predetermined initial driving velocity is set as the driving velocity, until a specified number of edges for calculating the driving velocity are outputted from the pulse signal generator after the driving velocity is replaced with the set velocity.

12. The motor control method according to claim 1, wherein
when the driving velocity is replaced with the set velocity, it is assumed that an edge for calculating the driving velocity is inputted from the pulse signal generator, and the edge cycle is measured.

13. A motor control device including:
a pulse generator that generates a pulse signal every time a driven target is driven for a specified distance by a motor;
a velocity calculator that measures a cycle between at least one of leading edges and trailing edges of the pulse signal outputted from the pulse signal generator, and calculates a driving velocity of the driven target from the measured edge cycle;
a driving controller that calculates a manipulated variable of the motor such that the calculated driving velocity corresponds to a specified target velocity and drives and controls the motor based on the manipulated variable; and
a velocity selector that replaces the driving velocity with a specified set velocity that is lower than the target velocity, when no output of the edges from the pulse signal generator continues for and over a specified replacement determination time while the motor is driven and controlled.

14. The motor control device according to claim 13, wherein
the velocity selector sets the set velocity based on the target velocity.

15. The motor control device according to claim 13, wherein
the velocity selector sets the set velocity based on the driving velocity calculated by the velocity calculator.

16. The motor control device according to claim 13, wherein
the velocity selector gradually reduces the driving velocity of the driven target using a plurality of set velocities, when no output of edges from the pulse signal generator continues for and over the specified replacement determination time.

17. The motor control device according to claim 13, wherein
the velocity selector can set a period in which the driving velocity can be replaced with the set velocity within one control cycle of the motor from the start to the end of the drive control by the driving controller.

18. The motor control device according to claim 13, further comprising
a stop determiner that, when no output of edges from the pulse signal generator continues for and over the specified replacement determination time while the motor is driven and controlled by the velocity selector, determines that the motor is stopped, and ends the drive control of the motor by the driving controller, wherein
the replacement determination time used by the velocity selector is set shorter than the stop determination time used by the stop determiner.

19. The motor control device according to claim 18, further comprising
a replacement determination time setting unit that sets the replacement determination time used by the velocity selector longer than the latest edge cycle used for calculating the driving velocity of the driven target by the velocity calculator.

20. The motor control device according to claim 19, wherein
when the replacement determination time which is set based on the edge cycle is no less than the stop determination time, the replacement determination time setting unit modifies the replacement determination time shorter than the stop determination time.

21. The motor control device according to claim 20, wherein when the replacement determination time set based on the edge cycle is no less than the stop determination time, the replacement determination time setting unit re-sets the replacement determination time shorter than the stop determination time based on the stop determination time.

22. The motor control device according to claim 19, wherein when the replacement determination time which is set based on the edge cycle is no less than the stop determination time, the replacement determination time setting unit modifies the stop determination time longer than the replacement determination time.

23. The motor control device according to claim 13, wherein the velocity calculator sets the set velocity or a predetermined initial driving velocity as the driving velocity, until a specified number of edges for calculating the driving velocity are outputted from the pulse signal generator after the driving velocity is replaced with the set velocity.

24. The motor control device according to claim 13, wherein when the velocity selector replaces the driving velocity with the set velocity, the velocity calculator assumes that an edge for calculating the driving velocity is inputted from the pulse signal generator and measures the edge cycle.

* * * * *